US010062187B1

(12) United States Patent
Cai et al.

(10) Patent No.: US 10,062,187 B1
(45) Date of Patent: Aug. 28, 2018

(54) SYSTEMS AND METHODS FOR REDUCING COMPUTER RESOURCES CONSUMPTION TO RECONSTRUCT SHAPE OF MULTI-OBJECT IMAGE

(71) Applicant: Macau University of Science and Technology, Macau (CN)

(72) Inventors: Zhanchuan Cai, Macau (CN); Ben Ye, Macau (CN); Ting Lan, Macau (CN); Youqing Xiao, Macau (CN)

(73) Assignee: Macau University of Science and Technology, Macau (CN)

( * ) Notice: Subject to any disclaimer, the term of this patent is extended or adjusted under 35 U.S.C. 154(b) by 0 days.

(21) Appl. No.: 15/635,217

(22) Filed: Jun. 28, 2017

(51) Int. Cl.
| | |
|---|---|
| G09G 5/00 | (2006.01) |
| G06T 11/20 | (2006.01) |
| G06F 17/11 | (2006.01) |
| G06T 7/60 | (2017.01) |
| G06T 7/13 | (2017.01) |
| G06T 7/12 | (2017.01) |
| G06T 5/00 | (2006.01) |

(52) U.S. Cl.
CPC ............ *G06T 11/203* (2013.01); *G06F 17/11* (2013.01); *G06T 7/12* (2017.01); *G06T 7/13* (2017.01); *G06T 7/60* (2013.01); *G06T 5/002* (2013.01); *G06T 2207/20016* (2013.01); *G06T 2207/20056* (2013.01); *G06T 2207/20064* (2013.01)

(58) Field of Classification Search
CPC . G06T 11/203; G06T 7/12; G06T 7/13; G06T 7/60; G06T 5/002; G06T 2207/20016; G06T 2207/20056; G06T 2207/20064; G06F 17/11
See application file for complete search history.

(56) References Cited

U.S. PATENT DOCUMENTS

| | | | |
|---|---|---|---|
| 9,792,689 B2* | 10/2017 | Shiozaki | ............... G06T 7/73 |
| 2012/0082385 A1* | 4/2012 | Xu | ............... G06K 9/6857 |
| | | | 382/199 |
| 2016/0275668 A1* | 9/2016 | Teomim | ............... G06T 5/002 |

OTHER PUBLICATIONS

E. Spyromitros-Xioufis, S. Papadopoulos, I. Y. Kompatsiaris, G. Tsoumakas, and I. Vlahavas, "A comprehensive study over VLAD and product quantization in large-scale image retrieval," IEEE Transactions on Multimedia, vol. 16, No. 6, pp. 1713-1728, 2014.
Y. Lu, H. Zhang, L. Wenyin, and C. Hu, "Joint semantics and feature based image retrieval using relevance feedback," IEEE Transactions on Multimedia, vol. 5, No. 3, pp. 339-347, 2003.

(Continued)

*Primary Examiner* — Abderrahim Merouan
(74) *Attorney, Agent, or Firm* — Eagle IP Limited; Jacqueline C. Lui

(57) ABSTRACT

Example embodiments include a method that reduces consumption of computer resources in a computer system to reconstruct a shape of a multi-object image using finite terms. The method includes computing an initial function by performing V-system of degree 0 and functions of curves by performing hierarchical V-system. Norms of the functions of curves are compared with a predetermined threshold. A reconstruction function of the shape of the multi-object image is generated by summing the initial function and the functions of curves.

17 Claims, 22 Drawing Sheets
(8 of 22 Drawing Sheet(s) Filed in Color)

(56) References Cited

OTHER PUBLICATIONS

G. T. Papadopoulos, K. C. Apostolakis, and P. Daras, "Gaze-based relevance feedback for realizing region-based image retrieval," IEEE Transactions on Multimedia, vol. 16, No. 2, pp. 440-454, 2014.

L. Chen, D. Xu, I. W. Tsang, and J. Luo, "Tag-based image retrieval improved by augmented features and group-based refinement," IEEE Transactions on Multimedia, vol. 14, No. 4, pp. 1057-1067, 2012.

T. Tsikrika, J. Kludas, and A. Popescu, "Building reliable and reusable test collections for image retrieval: The wikipedia task at imageclef," IEEE MultiMedia, vol. 19, No. 3, pp. 24-33, 2012.

S. Wang, J. Zhang, T. X. Han, and Z. Miao, "Sketch-based image retrieval through hypothesis-driven object boundary selection with HLR descriptor," IEEE Transactions on Multimedia, vol. 17, No. 7, pp. 1045-1057, 2015.

J. M. Guo, H. Prasetyo, and N. J. Wang, "Effective image retrieval system using dot-diffused block truncation coding features," IEEE Transactions on Multimedia, vol. 17, No. 9, pp. 1576-1590, 2015.

D. Valsesia, G. Coluccia, T. Bianchi, and E. Magli, "Large-scale image retrieval based on compressed camera identification," IEEE Transactions on Multimedia, vol. 17, No. 9, pp. 1439-1449, 2015.

A. Wang, J. Lu, J. Cai, T. J. Cham, and G. Wang, "Large-margin multimodal deep learning for RGB-D object recognition," IEEE Transactions on Multimedia, vol. 17, No. 11, pp. 1887-1898, 2015.

J. Tang, L. Jin, Z. Li, and S. Gao, "RGB-D object recognition via incorporating latent data structure and prior knowledge," IEEE Transactions on Multimedia, vol. 17, No. 11, pp. 1899-1908, 2015.

C. Huang, Z. He, G. Cao, and W. Cao, "Task-driven progressive part localization for fine-grained object recognition," IEEE Transactions on Multimedia, vol. 18, No. 12, pp. 2372-2383, 2016.

S. Berretti, A. D. Bimbo, and P. Pala, "Retrieval by shape similarity with perceptual distance and effective indexing," IEEE Transactions on Multimedia, vol. 2, No. 4, pp. 225-239, 2000.

B. Horowitz, "Find images by color, shape, and texture [new products]," IEEE MultiMedia, vol. 2, No. 3, p. 78, 1995.

A. W. Smeulders, M. Worring, S. Santini, A. Gupta, and R. Jain, "Content-based image retrieval at the end of the early years," IEEE Transactions on pattern analysis and machine intelligence, vol. 22, No. 12, pp. 1349-1380, 2000.

Y. Rui, T. S. Huang, M. Ortega, and S. Mehrotra, "Relevance feedback: a power tool for interactive content-based image retrieval," IEEE Transactionson circuits and systems for video technology, vol. 8, No. 5, pp. 644-655, 1998.

V. N. Gudivada and V. V. Raghavan, "Content based image retrieval systems," Computer, vol. 28, No. 9, pp. 18-22, 1995.

B. M. Mehtre, M. S. Kankanhalli, and W. F. Lee, "Shape measures for content based image retrieval: a comparison," Information Processing &Management, vol. 33, No. 3, pp. 319-337, 1997.

R. C. Veltkamp and M. Tanase, "Content-based image retrieval systems: A survey," Department of Computing Science, Utrecht University, pp. 1-62, 2002.

Y.-Y. Feng and D.-X. Qi, "A sequence of piecewise orthogonal polynomials," SIAM journal on mathematical analysis, vol. 15, No. 4, pp. 834-844, 1984.

R. Song, H. Ma, T. Wang, and D. Qi, "The complete orthogonal V-system and its applications," Communications on Pure and Applied Analysis, vol. 6, No. 3, p. 853, 2007.

R. Song, Y. Liang, X. Wang, and D. Qi, "Elimination of Gibbs phenomenon in computational information based on the V-system," in Pervasive Computing and Applications, 2007. ICPCA 2007. 2nd International Conference on. IEEE, 2007, pp. 337-341.

R. Song and M. Ou, "The application of V-system in the digital image transform," In Information and Automation, 2008. ICIA 2008. International Conference on. IEEE, 2008, pp. 296-301.

E. Hewitt and R. E. Hewitt, "The Gibbs-Wilbraham phenomenon: an episode in Fourier analysis," Archive for history of Exact Sciences, vol. 21, No. 2, pp. 129-160, 1979.

T. B. Sebastian, P. N. Klein, and B. B. Kimia, "Recognition of shapes by editing their shock graphs," IEEE Transactions on Pattern Analysis and Machine Intelligence, vol. 26, No. 5, pp. 550-571, 2004.

\* cited by examiner

500

Pseudo Code 1: Hierarchical V-system algorithm

1: Input : Function of a multi-object shape $F(t)$;
2:         Given a threshold $\varepsilon$.
3: Output : Reconstruction function of multi-object shape
4: Let $F(t)$ convert into a parameter form
5: compute $\tilde{f}$ with Hierarchical V-system ( $F(t)$ )
6:   case 1:
7:       The function of the first curve
8:   case 2:
9:       The function of the second curve
10:       ⋮
11:   case $k$:
12:       The function of the $k$-th curve
13: Obtain reconstruction function:
14: $\tilde{f} = f_0 + r_1 + r_2 + ... + r_k$
15: Procedure Hierachical V-system ( $F(t)$ )
16: for $k \leqslant \infty$ do
17:     $f_0 = \sum_{i=1}^{N_1} a_i^{(0)} V_i^{(0)}$
18:     $a_i^{(k)} = \int_0^1 \begin{pmatrix} x(t) \\ y(t) \end{pmatrix} V_i^{(k)}(t) dt$
19:     $i = 0, 1, 2, 3, ..., k$
20:     $r_k$ =V-system Transform$(a_i, k, \varepsilon)$
21:     $r_k = F(t) - r_{k-1}$
22:     If norm : $\|r_k\| \approx 0$
23:         Stop loop
24:     end if
25: end for
26: end Procedure
27: Hierachical V-system ( $a_i, k, \varepsilon$ )
28: for $j = 1$ to $N_k$ do
29:     $r_k = r_{k-1} - \sum_{j=1}^{N_k} a_j^{(k-1)} V_j^{(k-1)}$, $k \geqslant 1$
30:     If norm : $\|r_k\| \leqslant \varepsilon$
31:         return $r_k$
32:     end if
33: end for
34: end Function

Figure 5

SYSTEMS AND METHODS FOR REDUCING COMPUTER RESOURCES CONSUMPTION TO RECONSTRUCT SHAPE OF MULTI-OBJECT IMAGE

FIELD OF THE INVENTION

The present invention relates to methods and apparatus that reduce consumption of computer resources to reconstruct a shape of a multi-object image by finite terms.

BACKGROUND

Since a multi-object shape contains the continuous graphics and the discontinuous graphics, the representation of the multi-object shape with traditional methods causes Gibbs phenomenon. For example, Fourier transform and continuous wavelet transform cannot exactly represent multi-object shape by finite terms because they have strong continuity. Hence, they are not suitable for representation of multi-object shape. As multi-object image retrieval consumes substantial computer resources, new methods and apparatus that assist in advancing technological needs and industrial applications in effective computation for reconstruction of multi-image shape by finite terms are desirable.

SUMMARY OF THE INVENTION

One example embodiment is a method that reduces consumption of computer resources in a computer system to reconstruct a shape of a multi-object image using finite terms. The method includes computing an initial function $f_0$ by performing V-system of degree 0, $V_i^{(0)}$, to a function $F(t)$ of the shape of the multi-object image; computing a function $r_1$ by $r_1 = F(t) - f_0$; computing a norm of function $\|r_1\|$; computing $N_1$ by comparing $\|r_1\|$ with a predetermined threshold $\varepsilon$; reducing the consumption of computer resources by performing a hierarchical iteration from $k=2$ to $k=h$; and reconstructing the shape of the multi-object image by generating a reconstruction function.

Other example embodiments are discussed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5 shows a pseudo code illustrating an algorithm for a process of the hierarchical V-system in accordance with an example embodiment.

DETAILED DESCRIPTION

Figure 1:
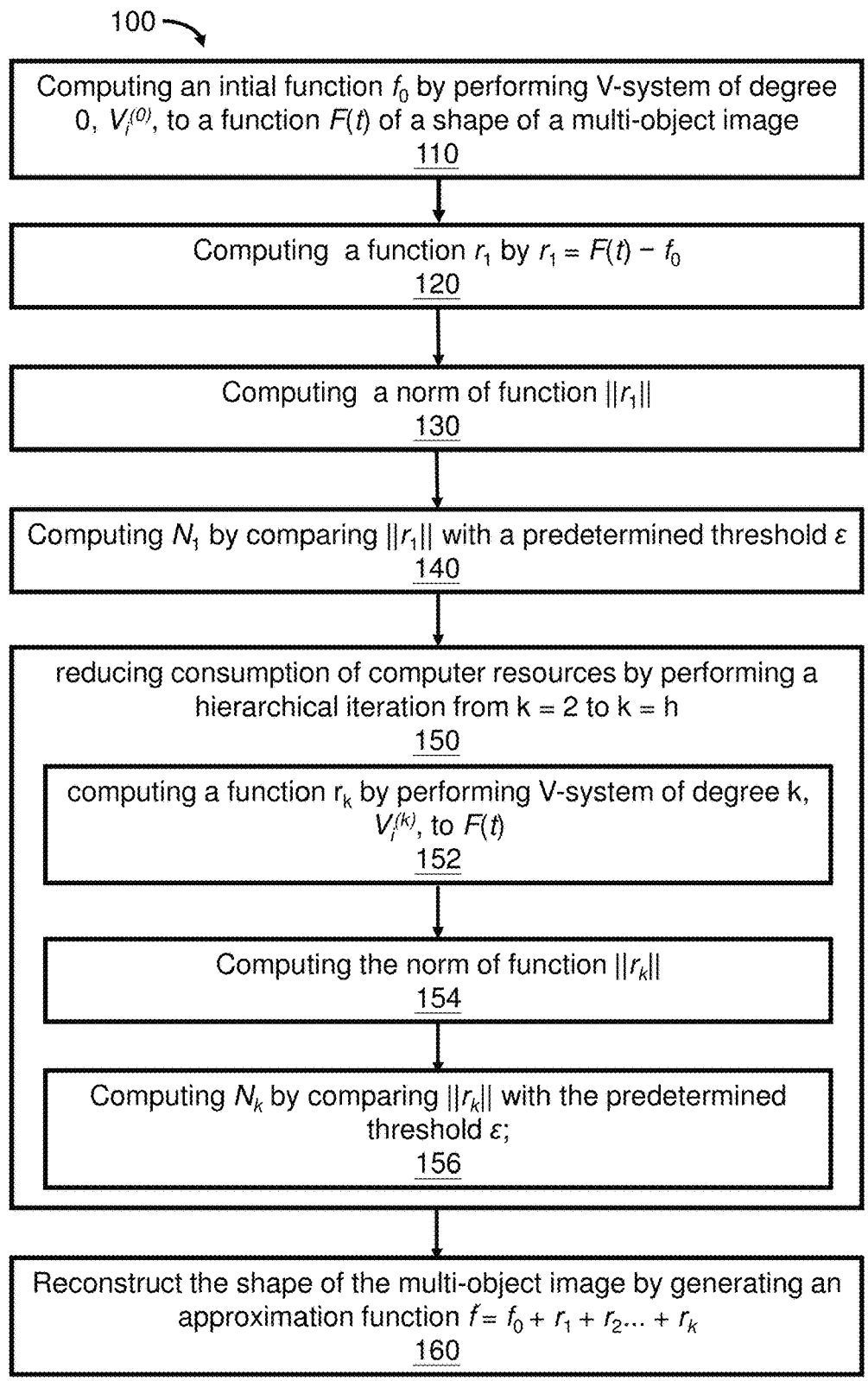
FIG. 1 shows a method that reduces consumption of computer resources by reconstructing a shape of a multi-object image in accordance with an example embodiment.

Example embodiments relate to apparatus and methods that reduce consumption of computer resources in a computer system to reconstruct a shape of a multi-object image using finite terms.

In the era of big data, more and more images are generated every day with the recent developments in digital imaging technologies. Millions of images are available via the internet. There is a growing interest in image retrieval and object recognition in collections or from remote databases. In order to achieve this task, images have to be represented by specific features. How to represent two or more sufficiently separated objects in an image is important. Yet, multi-object image retrieval based on shape and topology is difficult. The representation of shape is the main content of multi-object image retrieval because shape is the most promising for the identification of entities in an image. Shape is a concept which is widely understood but difficult to define formally. The human perception of shapes is a high-level concept whereas mathematical definitions tend to describe shape with low-level features.

With the increasing number of images generated every day, textual annotation of images becomes impractical and inefficient. For comparing images, content-based image retrieval (CBIR) uses generic image features that are traditionally either intensity-based (color and texture) or geometry-based (shape and topology). Methods using textual annotation of images and then searching images using their annotations are not practical for large databases. In addition, the textual annotation of image content by itself is a difficult and subjective process.

The widely used methods of reconstruction for object shape are the Fourier series and the wavelet methods, e.g., orthogonal functions. However, not all complete orthogonal function systems are suitable for the analysis and synthesis of multi-object shape. Fourier system, Legendre system, and Chebyshev system are orthogonal function systems, but they cannot accurately represent commonly multi-object shape by finite terms, because the well-known Gibbs phenomenon is a serious obstacle. Thus, they are not suitable for the representation of multi-object shape.

A class of complete orthogonal system, called U-system, is composed by the piecewise polynomials of degree k (k=0, 1, 2, 3 . . . ) in interval [0,1], and this system can be used effectively to represent geometrical models by finite terms. The system treats both continuous and discontinuous signals with advantages. Since U-system of degree 0 is the Walsh system, U-system of degree 1 is just the slant transform widely applied in image processing, so U-system is generalization of the Walsh system. Based on U-system, an orthogonal function system for signal processing—the V-system is proposed. The V-system can be considered as the generalization of the Haar wavelet system, namely a Haar wavelet method, because the Haar wavelet system is just a special case of the V-system with k=0. The method using V-system is named a V-system method.

Example embodiments include a method that avoids Gibbs phenomenon and represents multi-object shape with fewer finite terms than the V-system method.

Example embodiments include a method that reduces consumption of computer resources to process instructions that reconstruct a shape of a multi-object image using as few finite terms as possible. Such example embodiments provide a significant advantage over conventional solutions by expediting computation of the shape of the multi-object image and using less computer resources to execute the computation.

Example embodiments include properties of a V-system. For example, an example embodiment is an alternative to a wavelet representation of a signal with piecewise smoothness for its properties of the time localization, smoothness, orthogonality, and symmetry. In particular, Example embodiments are an effective and accurate tool in the representation of multi-object shapes.

Example embodiments solve the above-stated problems or difficulties by providing new methods and apparatus that improve or facilitate the computation of reconstruction of a shape of a multi-object image.

In one example embodiment, an initial function $f_0$ is computed by a computer system by performing V-system of degree 0, $V_i^{(0)}$, to a function F(t) of the shape of the multi-object image.

By way of example, $f_0$ is expressed as:

$$f_o = \sum_{i=1}^{N_1} a_i^{(0)} V_i^{(0)}.$$

By way of example, a function $r_1$ is computed by $r_1 = F(t) - f_0$ by the computer system.

By way of example, a norm of function $\|r_1\|$ is computed by the computer system.

By way of example, $N_1$ is computed by the computer system by comparing $\|r_1\|$ with a predetermined threshold ε.

By way of example, the consumption of computer resources is reduced by the computer system by performing a hierarchical iteration from k=2 to k=h, where a norm of function $\|r_k\|=0$ for k=h.

By way of example, the hierarchical iteration includes computing a function $r_k$ by performing V-system of degree k, $V_i^{(k)}$, to F(t); computing the norm of function $\|r_k\|$; and computing $N_k$ by comparing $\|r_k\|$ with the predetermined threshold c by the computer system.

By way of example, $r_k$ is expressed as:

$$r_k = r_{k-1} - \sum_{i=1}^{N_k} a_i^{(k-1)} V_i^{(k-1)}.$$

By way of example, the shape of the multi-object image is reconstructed by the computer system by generating a reconstruction function $\tilde{f} = f_0 + r_1 + r_2 \ldots + r_k$.

Example embodiments include a method that provides good square approximation and uniform approximation for the generation of a geometrical model for a multi-image. Finite terms of the series can be used to realize the accurate expression of the shape of a multi-object image. For the same precision representation of a multi-object shape, the terms of series with a method in example embodiments are fewer than the V-system method.

The Gibbs phenomenon is the peculiar manner in which the Fourier series of a piecewise continuously differentiable periodic function behaves at a jump discontinuity. To illustrate what is happening in the Gibbs phenomenon, the partial sums of a Fourier series are examined. Let g(x) be a periodic, piecewise smooth function with a jump discontinuity at $x_0$. For any fixed $x_1$, not equal to $x_0$, the partial sums of g(x) at $x_1$ approach $g(x_1)$. That is, if $s_n$ is the partial sum of g, then $$\lim_{n \to \infty} s_n(x_1) = g(x_1).$$

However, if x is allowed to approach the discontinuity as the partial sums are taken to the limit, an overshoot, or undershoot, may occur. That is, $$\lim_{\substack{n\to\infty \\ x_n \to x_0^+}} s_n(x_1) \ne g(x_1^+),$$

and, $$\lim_{\substack{n\to\infty \\ x_n \to x_0^-}} s_n(x_1) \ne g(x_1^-),$$

are possible. This overshoot, or undershoot, is called the Gibbs phenomenon.

FIG. 1 shows a method executed by a computer system that reduces consumption of computer resources to process instructions that reconstruct a shape of a multi-object image using finite terms in one example embodiment. By way of example, the computer system includes a processor, a memory having computer resources stored therein, and a non-transitory computer readable medium having stored therein instructions to be executed.

Block 110 shows computing an initial function $f_0$ by performing V-system of degree 0, $V_i^{(0)}$, to a function F(t) of the shape of the multi-object image.

By way of example, $f_0$ is expressed as:

$$f_0 = \sum_{i=1}^{N_1} a_i^{(0)} V_i^{(0)}.$$

By way of example, the general terms of $V_i^{(0)}$ can be found in Appendix below.

Block 120 shows computing a function $r_1$ by $r_1 = F(t) - f_0$.

By way of example, F(t) is a function of a multi-object shape $F(t) = g_i(t)$, where $$t \in \left[\frac{i}{n}, \frac{i+1}{n}\right], i = 0, 1, \ldots, n.$$

By way of example, a curve of a given multi-object shape is represented as a parameter form, and the function of a multi-object shape is $$\begin{cases} x(t) = F_x(t) \\ y(t) = F_y(t) \end{cases}.$$

Block 130 shows computing a norm of function $\|r_1\|$.

By way of example, $r_1$ is an error value.

Block 140 shows computing $N_1$ by comparing $\|r_1\|$ with a predetermined threshold $\varepsilon$.

By way of example, when $\|r_1\| \le \varepsilon$, $N_1$ is obtained.

Block 150 shows reducing the consumption of computer resources by performing a hierarchical iteration from k=2 to k=h.

By way of example, when a norm of function $\|r_k\|$ equals or approximately equals to 0, k=h and the hierarchical iteration is stopped.

Block 152 shows computing a function $r_k$ by performing V-system of degree k, $V_i^{(k)}$, to F(t).

By way of example, $r_k$ is expressed as:

$$r_k = r_{k-1} - \sum_{i=1}^{N_k} a_i^{(k-1)} V_i^{(k-1)}$$

By way of example, by orthogonality, $$a_i^{(k)} = \int_0^1 \binom{x(t)}{y(t)} V_j^{(k)}(t) dt,$$

$$j = 0, 1, 2, \ldots, n-1; k = 0, 1, 2, \ldots h.$$

By way of example, $r_2$ is calculated by:

$$r_2 = r_1 - \sum_{i=1}^{N_2} a_i^{(1)} V_i^{(1)},$$

where $V_i^{(1)}$ means the V-system of degree 1, the general formula of $V_i^{(1)}$ can be found in the Appendix below.

Block 154 shows computing the norm of function $\|r_k\|$.

By way of example, the norm of function $r_2$: $\|r_2\|$ can be computed.

Block 156 shows computing $N_k$ by comparing $\|r_k\|$ with the predetermined threshold $\varepsilon$.

By way of example, $\varepsilon$ is compared with $\|r_2\|$, if $\varepsilon > \|r_2\|$, $N_2$ is obtained.

Block 160 shows reconstructing the shape of the multi-object image by generating an reconstruction function $\tilde{f} = f_0 + r_1 + r_2 \ldots + r_k$.

By way of example, an interval [0,1] is equally divided into n sub-intervals, $t \in [0,1]$. $f_0 + r_1 + r_2 \ldots + r_k$ are multiple approximated functions.

By way of example, a number of reconstruction terms is $N_1 + N_2 + \ldots + N_k$.

By way of example, the curve of a given multi-object shape is reconstructed by:

$$P(t) = \binom{x(t)}{y(t)} = \sum_{k=0}^{h} \sum_{i=0}^{N_k} a_i^{(k)} V_i^{(k)}(t).$$

By way of example, for a given multi-object shape F(T), it can be used P(t) pairs of segmentation for the n-segment straight-line group of finite precision expression.

Figure 2:
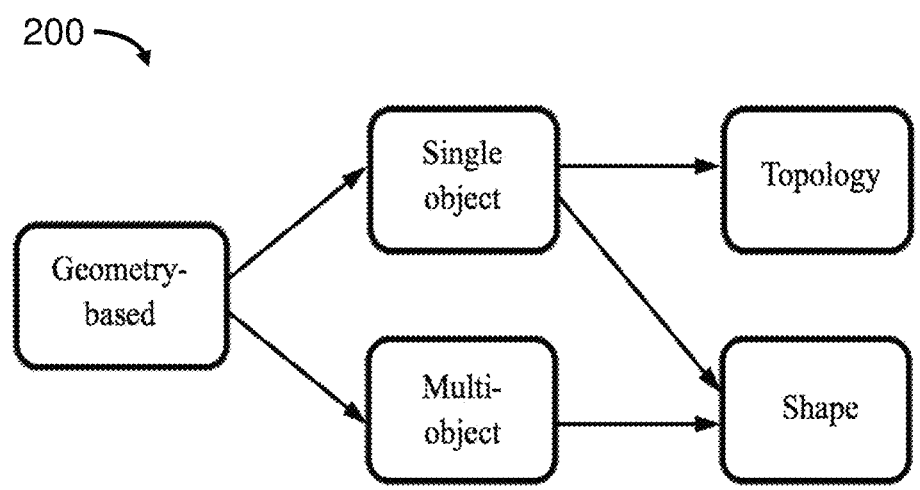
FIG. 2 shows categorization of the generic image features as geometry-based in shape and topology in accordance with an example embodiment.

FIG. 2 shows categorization of the generic image features as geometry-based in shape and topology. Shape is considered as the most promising for the identification of entities.

It is easy to cause the Gibbs phenomenon when multi-object shape is represented by continuous wavelet transform such as a Fourier transform, namely a Fourier method.

Figure 3:
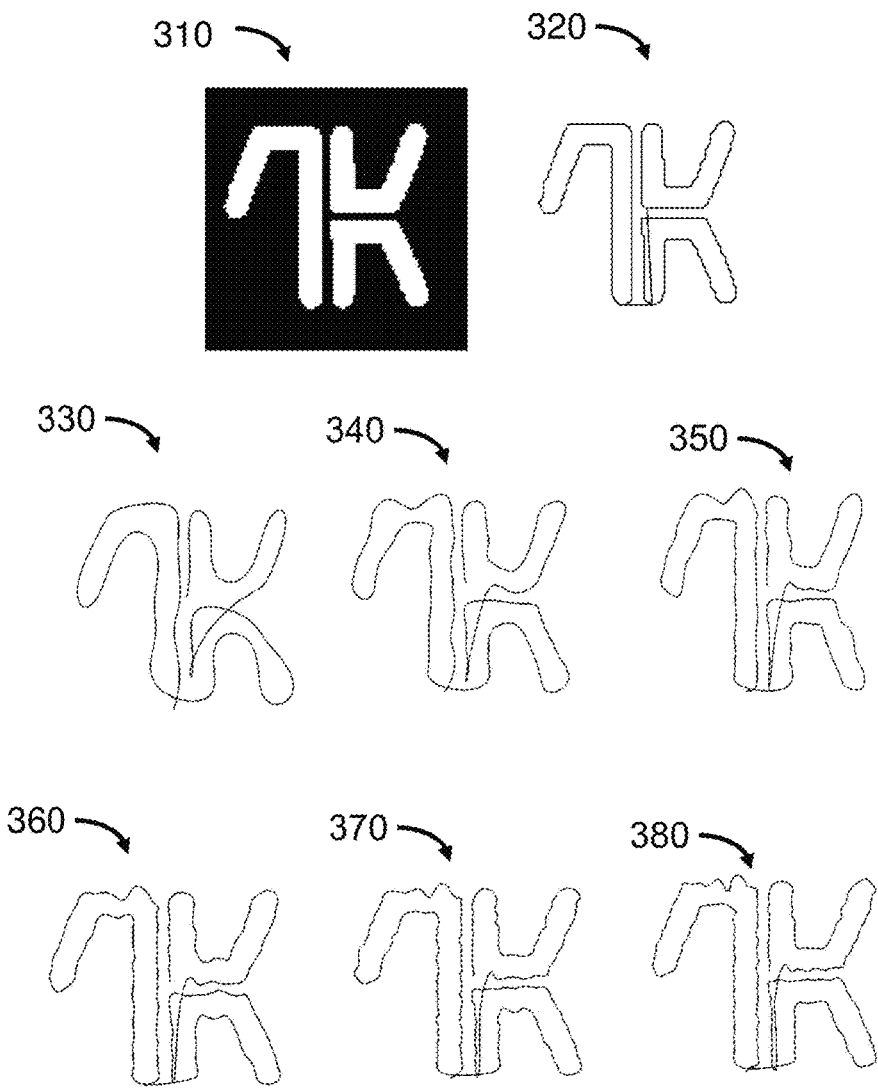
FIG. 3 shows representations of a multi-object image in a multi-object shape using the Fourier method.

FIG. 3 shows representations of a multi-object image 310 in a multi-object shape 320. Representation 330 is generated by the Fourier method with 20 terms; representation 340 is generated by the Fourier method with 40 terms; representation 350 is generated by the Fourier method with 60 terms; representation 360 is generated by Fourier method with 80 terms; representation 370 is generated by Fourier method with 100 terms; representation 380 is generated by Fourier method with 120 terms. FIG. 3 shows the Gibbs phenomenon reflects the difficulty inherent in approximating a discontinuous function by a finite series of continuous sine and cosine waves. With Fourier method for fully reconstructed of multi-object shape, Gibbs phenomenon appears. The Gibbs phenomenon can be avoided by V-system reconstruction.

The V-system of degree k is ordered by classes and groups. The first group contains only one class consisting of the first k+1 functions which are the Legendre polynomials on [0,1]. It is denoted as:

$$\{V_{k,1}^1(x), V_{k,1}^2(x), \ldots, V_{k,1}^{k+1}(x)\}.$$

The second group also contains only one class consisting of the second k+1 functions which are the $k^{th}$-order generators. It is denoted as:

$$\{V_{k,2}^1(x), V_{k,2}^2(x), \ldots, V_{k,2}^{k+1}(x)\}.$$

Figures 4A, 4B, 4C:
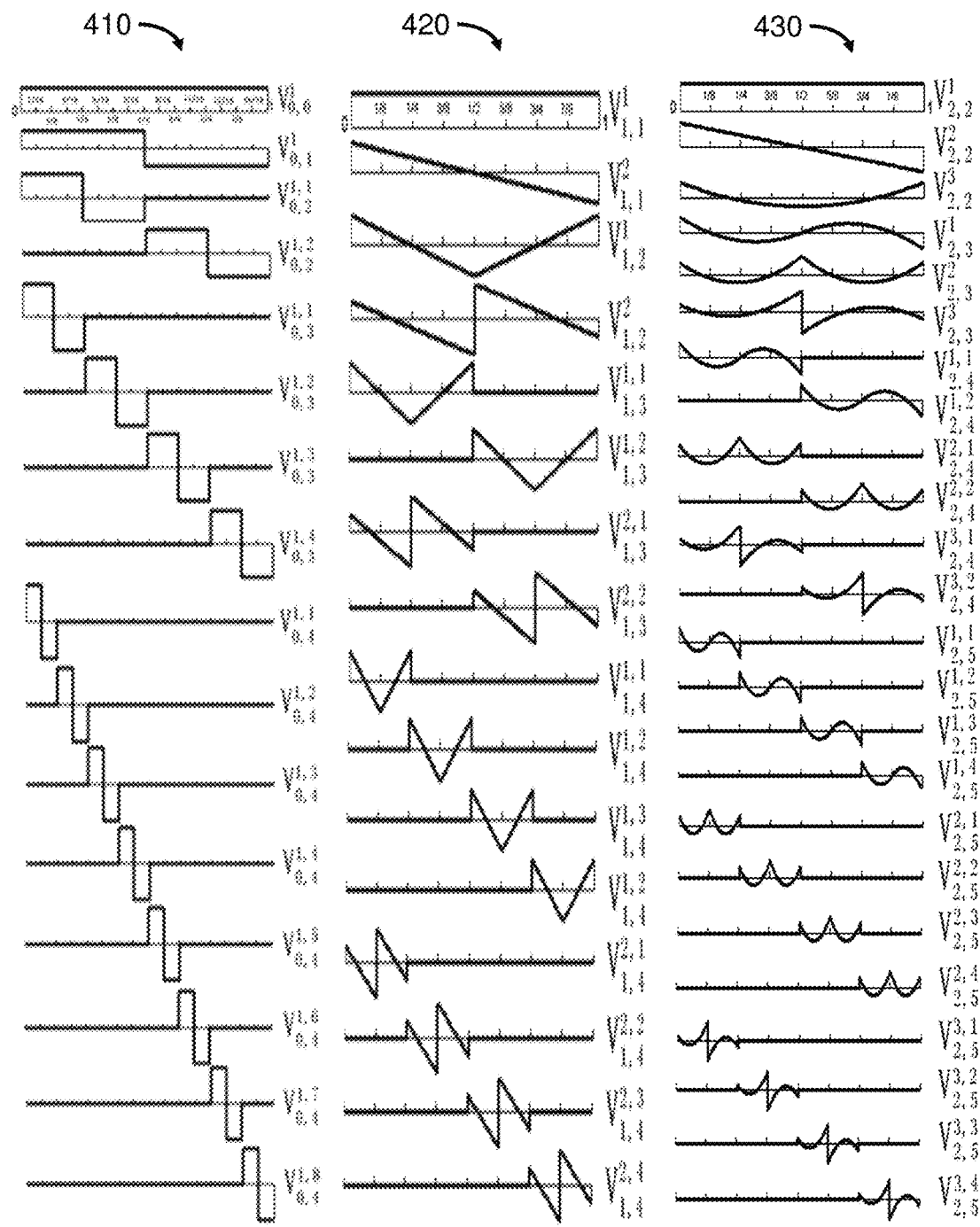
FIGS. 4A, 4B, 4C and 4D show functions of V-system of degree k=0, 1, 2, 3 respectively.
Figure 4D:
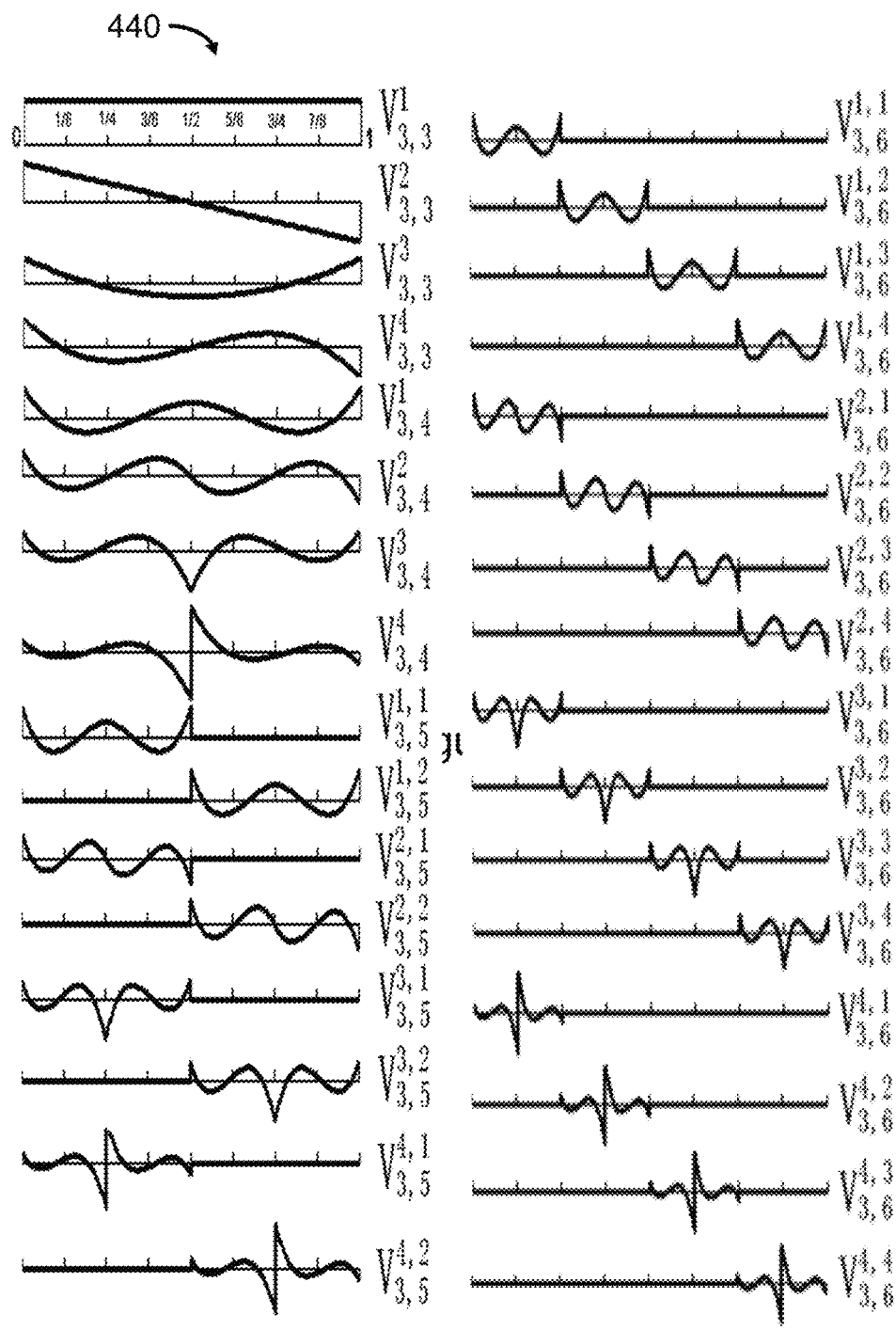

Sequentially performing multi-scale squeezing, shifting and duplicating operations on the generators, so the other functions in the V-system of degree k are obtained. From the beginning of the third group of the V-system of degree k, the $m^{th}$ group consists of k+1 classes and each class includes $2^{m-2}$ functions. $V_{k,m}^{i,j}(x)$ is denoted as the $j^{th}$ function in the $i^{th}$ class of the $m^{th}$ group in V-system of degree k, where k=0, 1, 2, . . . ; m=3, 4, . . . and j=1, 2, . . . , $2^{m-2}$. From the beginning of the third group of the V-system, each group consists of k+1 classes and each class has $2^{m-2}$ functions. FIG. 4A shows the first 16 basic functions of the V-system with degree k=0. The V-system of degree k=0 is just Haar wavelet system which is the most important and widely known wavelets. FIG. 4B shows the first 16 basic functions of the V-system with degree k=1. FIG. 4C shows the first 24 basic functions of the V-system with degree k=2. FIG. 4D shows the first 32 basic functions of the V-system with degree k=3.

Example embodiments include a method using a hierarchical V-system, namely hierarchical V-system method that accurately represents a multi-object shape with finite terms. FIG. 5 shows a pseudo code 500 illustrating an algorithm for a process of the hierarchical V-system in one example embodiment.

By way of example, an interval [0,1] is equally divided into n sub-intervals, t∈[0,1]. In this algorithm, multiple approximated functions $f_0, r_1, \ldots, r_k$, are used and function F(t) is the function of a multi-object shape.

$$F(t) = g_i(t),$$

where $$t \in \left[\frac{i}{n}, \frac{i+1}{n}\right], i = 0, 1, \ldots, n.$$

Then, the curve of a given multi-object shape is represented as a parameter form, and the function of multi-object shape is:

$$\begin{cases} x(t) = F_x(t) \\ y(t) = F_y(t). \end{cases}$$

The V-system of degree 0 is performed to the multi-object shape, so the function $f_0$ can be obtained. Function $f_0$ is the initial function in the hierarchical V-system of degree 0, and it can be expressed as:

$$f_0 = \sum_{i=1}^{N_1} a_i^{(0)} V_i^{(0)},$$

where $V_i^{(0)}$ means the V-system of degree 0, the general terms of $V_i^{(0)}$ can be found in the Appendix below. Given a threshold ε, then the value of $N_1$ can be computed. Moreover, an error can be obtained, as is shown follows:

$$r_1 = F(t) - f_0.$$

Then, the norm of function r1: ‖r1‖ can be computed. Compare ε with ‖r1‖, if ε>‖r1‖, $N_1$ is obtained. Then, function $r_2$ should be calculated. It is used as the approximated function for the hierarchical V-system of degree 2, and $r_2$ is $$r_2 = r_1 - \sum_{i=1}^{N_2} a_i^{(1)} V_i^{(1)},$$

where $V_i^{(1)}$ means the V-system of degree 1, the general formula of $V_i^{(1)}$ can be found in the Appendix below. Then, the norm of function $r_2$: ‖$r_2$‖ can be computed. Compare ε with ‖$r_2$‖, if ε>‖$r_2$‖, $N_2$ is obtained. Then, function $r_3$ should be calculated In the same way, the function $r_k$ can be obtained $$r_k = r_{k-1} - \sum_{i=1}^{N_k} a_i^{(k-1)} V_i^{(k-1)},$$

where $V_i^{(k-1)}$ means the V-system of degree k−1, the general terms of $V_i^{(k-1)}$ can be found in the Appendix below. Then, the norm of function $r_k$: ‖$r_k$‖ can be computed. Compare ε with $r_k$, if ‖$r_k$‖≈0, the hierarchical iteration should be stopped. The number of reconstruction terms is $N_1+N_2+\ldots+N_k$. The approximated function is $\tilde{f} = f_0 + r_1 + r_2 \ldots + r_k$. By orthogonality, we have $$a_i^{(k)} = \int_0^1 \binom{x(t)}{y(t)} V_j^{(k)}(t) dt,$$

$$j = 0, 1, 2, \ldots, n-1; k = 0, 1, 2, \ldots h,$$

where $V_j^{(k)}(t)$ means the V-system of degree k.

$$\text{Let } P(t) = \binom{x(t)}{y(t)} = \sum_{k=0}^{h} \sum_{i=0}^{N_k} a_i^{(k)} V_i^{(k)}(t),$$

hence, the curve of a given multi-object shape can be reconstructed. In other words, for a given multi-object shape F(t), it can be used P(t) pairs of segmentation for the n-segment straight-line group of finite precision expression.

Experiments were done to verify the hierarchical V-system method in one example embodiment. Given an error limit e, if the error of the reconstructed shape is less than e, it can be considered as the accurate reconstruction.

Shape representation means obtaining a set of features characterizing the shape in such a way that it becomes possible to reconstruct the shape from such features. Shape description is the extraction of shape features in order to quantify significant properties of the shape. The following steps show the process of shape extraction step.

First, a true color image or a grayscale image is converted into the binary image. An image includes the target objects and the background noise. In order to extract the target object directly from multivalued digital image, a global threshold T is set, thresholding creates binary images from grey-level ones by turning all pixels below threshold T to zero and all pixels about that threshold to one. If $I^0(x,y)$ is a thresholded image of the grayscale image $I(x,y)$ at the global threshold T, $$I'(x, y) = \begin{cases} 1, \text{ if } I(x, y) \geq T, \\ 0, \text{ otherwise,} \end{cases}$$

where (x,y) represents the value of the pixel.

Second, a Gaussian blur is applied. In image processing, the Gaussian blur is the result of blurring an image that uses a Gaussian function for calculating the transformation to apply to each pixel in the image. The equation of a Gaussian function in two dimensions is $$G(x, y) = \frac{1}{2\pi\sigma^2} e^{-\frac{x^2+y^2}{2\sigma^2}},$$

where x is the distance from the origin in the horizontal axis, y is the distance from the origin in the vertical axis, and $\sigma$ is the standard deviation of the Gaussian distribution.

Third, a contour is found. After the edge image is obtained by the Canny edge detector. The pixel value of the edge image is represented as $f(x,y)$, each line-scan terminates in the following two cases:

(1) $f(x,y-1)=0, f(x,y)=1, f(x,y)$ is the starting point of the outer boundary;
(2) $f(x,y-1)\geq 1, f(x,y+1)=0,) f(x,y)$ is the starting point of the hole boundary.

Next, from the starting point starts marking the pixels on the edge. Here, a unique identifier is assigned to the newly discovered edge, called NBD. The initial NBD=1, each time a new boundary is found, NBD pluses one. In this process, $f(x,y)$ is set to NBD when $f(x,y)=1$ and $f(x,y+1)=0$. Then, according to the area and perimeter of the target object, an area threshold $T^0$ is set. If the area of an object is less than the threshold $T^0$, it is removed. Otherwise, it is reserved.

Fourth, according to the perimeter and the number of points of the contour, the length of each contour segment is calculated. Then, according to the length of each contour segment, linear interpolation is done in the contour, and the most qualified points are obtained.

Finally, correction is used for the points. Because of the accuracy of floating-point precision of linear interpolation, it is possible that the number of points is not enough. Therefore, the points should be completed that less than the number of segment points. The coordinates of the complete points are chosen directly from the coordinates of the last point.

Figure 6:
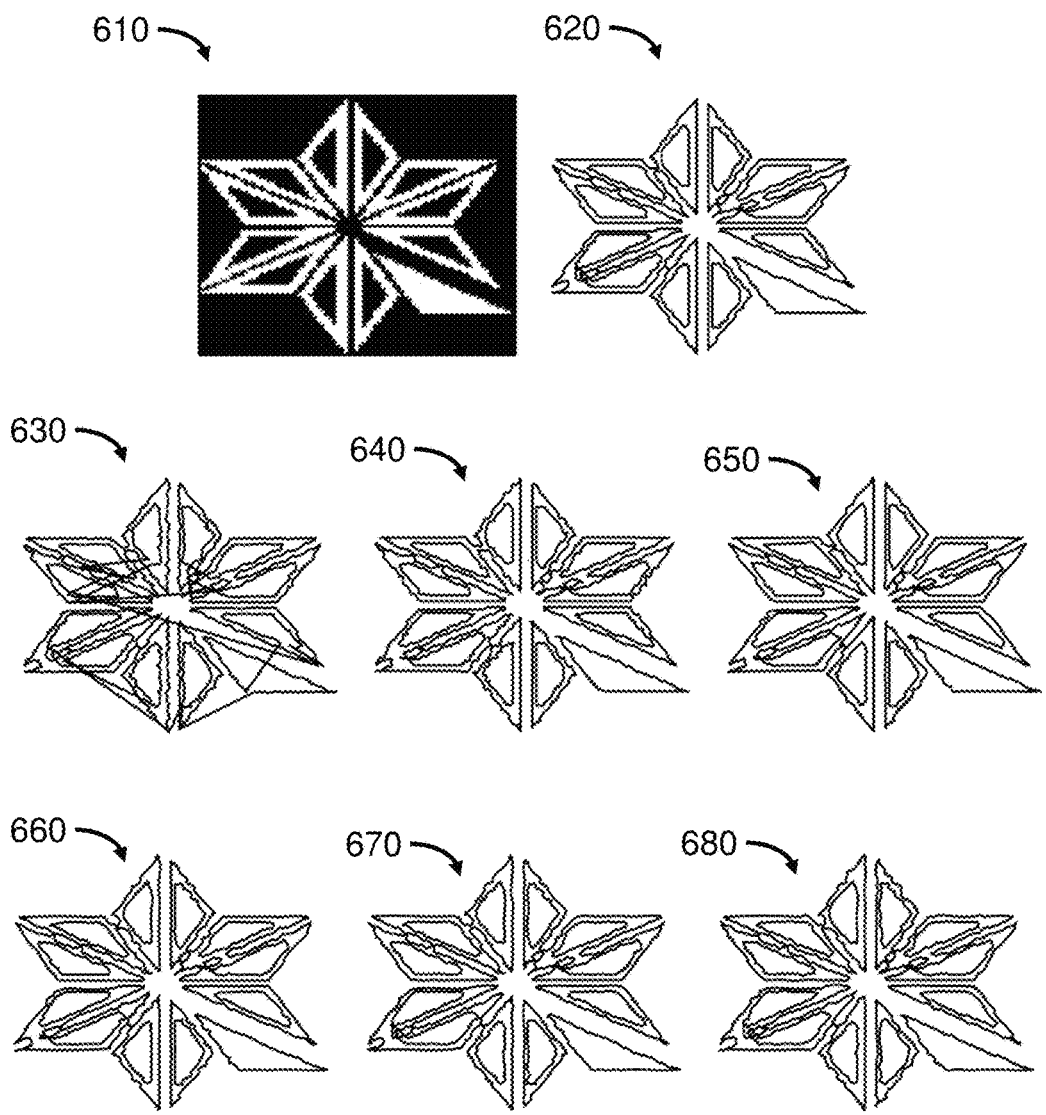
FIG. 6 shows representations for a multi-object image in multi-object shape (a Hexagon) using the Fourier method, the Haar wavelet method, the V-system method and the hierarchical V-system method in accordance with an example embodiment.
Figure 7:
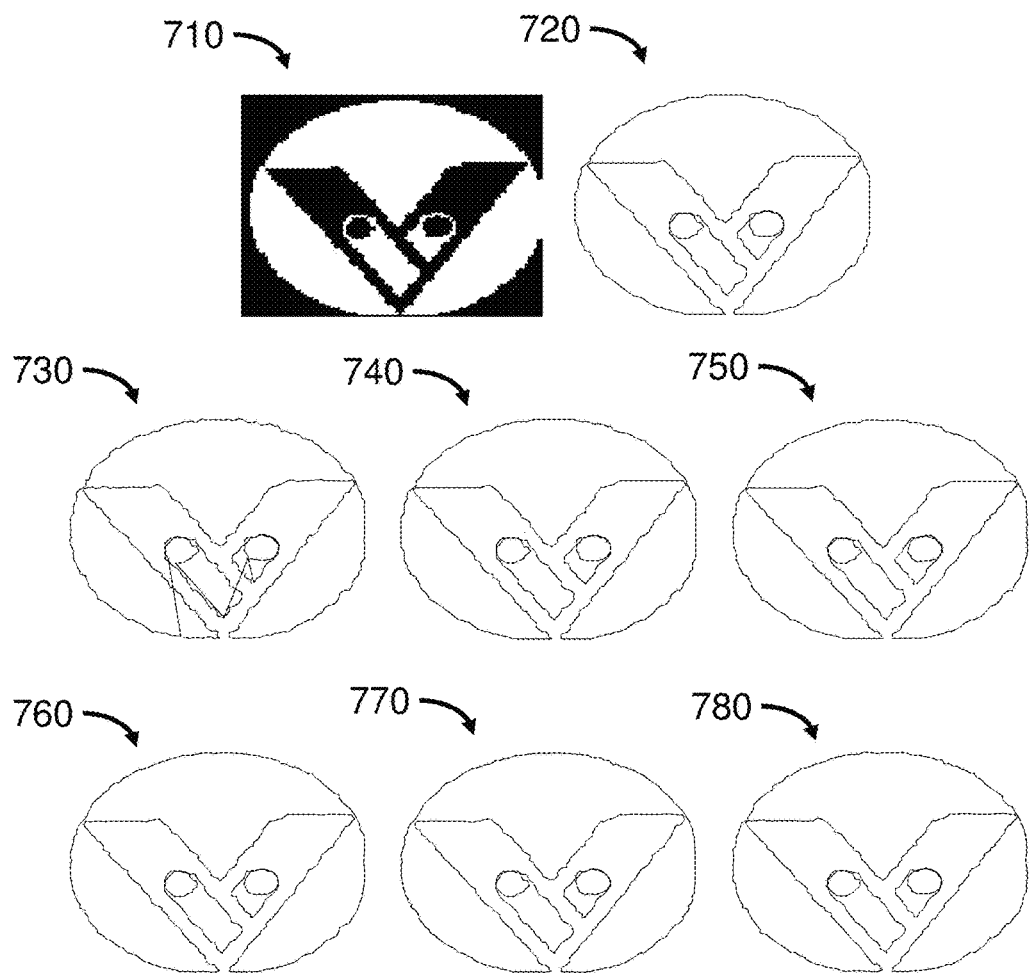
FIG. 7 shows representations for a multi-object image in multi-object shape (a mark) using the Fourier method, the Haar wavelet method, the V-system method and the hierarchical V-system method in accordance with an example embodiment.
Figure 8:
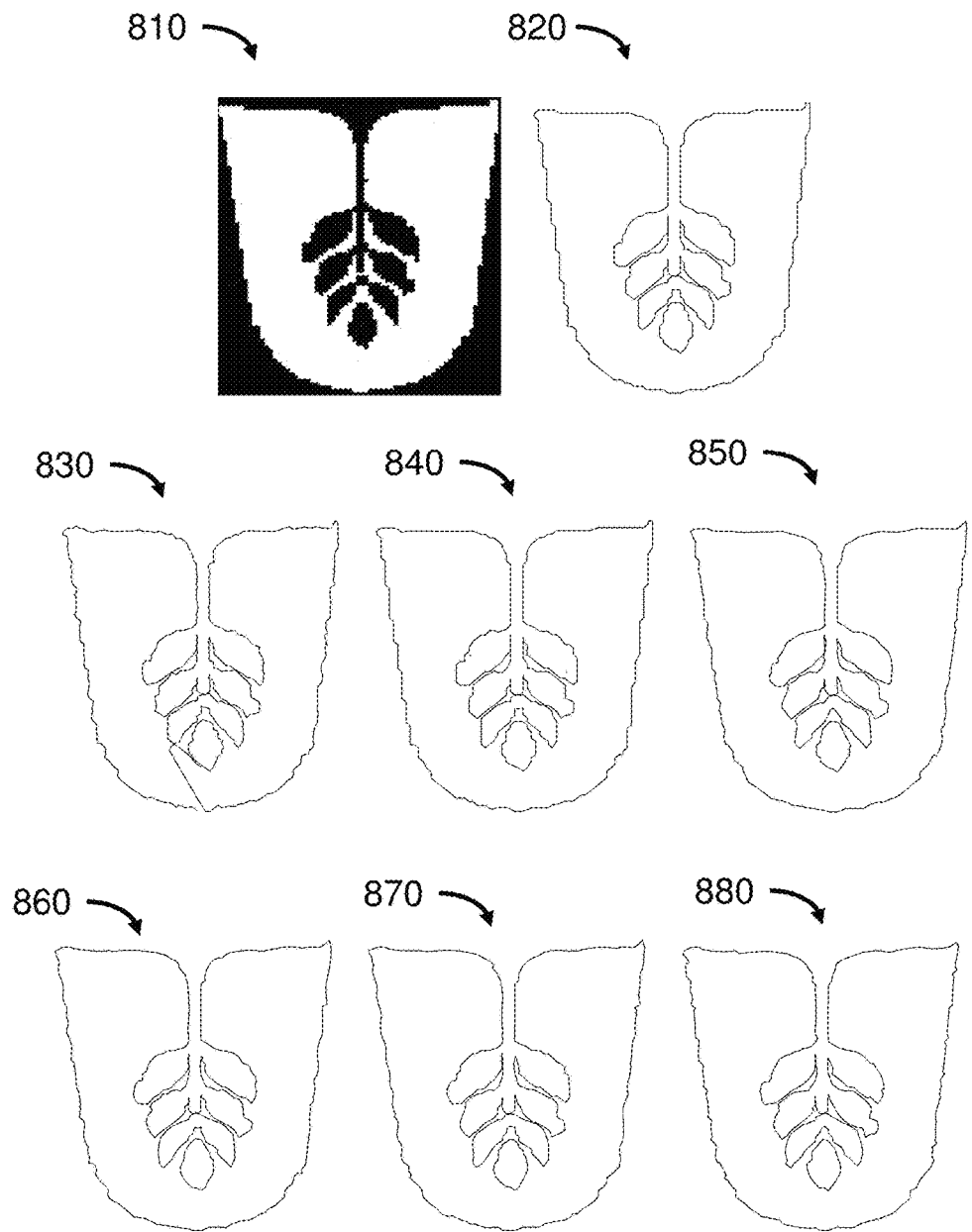
FIG. 8 shows representations for a multi-object image in multi-object shape (a leaf) using the Fourier method, the Haar wavelet method, the V-system method and the hierarchical V-system method in accordance with an example embodiment.

FIG. 6, FIG. 7 and FIG. 8 illustrate the results of reconstructing different multi-object shapes using the Fourier method, the Haar wavelet method, the V-system method and the hierarchical V-system method in one example embodiment. The reconstruction of multi-object shape with continuous wavelets (such as method using Daubechies-2(db2) wavelet cause the Gibbs phenomenon. Thus, a non-continuous wavelet named Haar wavelet is selected.

FIG. 6 shows representations for a multi-object image 610 in multi-object shape 620, i.e. a hexagon. Representation 630 is generated by the Fourier method with 765 terms; representation 640 is generated by the Haar wavelet method with 558 terms; representation 650 is generated by the V-system of degree 1 reconstruction with 383 terms; representation 660 is generated by the V-system of degree 2 reconstruction with 423 terms; representation 670 is generated by the V-system of degree 3 reconstruction with 448 terms; representation 680 is generated by the hierarchical V-system method with 311 terms.

FIG. 7 shows representations for a multi-object image 710 in multi-object shape 720, i.e. a mark. Representation 730 is generated by the Fourier method with 345 terms; representation 740 is generated by the Haar wavelet method with 449 terms; representation 750 is generated by the V-system of degree 1 reconstruction with 209 terms; representation 760 is generated by the V-system of degree 2 reconstruction with 209 terms; representation 770 is generated by the V-system of degree 3 reconstruction with 199 terms; representation 780 is generated by the hierarchical V-system method with 126 terms.

FIG. 8 shows representations for a multi-object image 810 in multi-object shape 820, i.e. a leaf. Representation 830 is generated by the Fourier method with 270 terms; representation 840 is generated by the Haar wavelet method with 354 terms; representation 850 is generated by the V-system of degree 1 reconstruction with 164 terms; representation 860 is generated by the V-system of degree 2 reconstruction with 164 terms; representation 870 is generated by the V-system of degree 3 reconstruction with 169 terms; representation 880 is generated by the hierarchical V-system method with 99 terms.

FIGS. 9, 12, 15, 19 show the reconstruction terms of the Fourier method, the Harr wavelet method, the V-system of degree 1, the V-system of degree 2 and the V-system of degree 3 for different images shown in FIGS. 11, 14, 17 and 18 respectively. It can be found that the number of reconstruction terms with the V-system (degree 1, 2, 3) are fewer than the Fourier method and the Haar wavelet method. Under the same conditions, the reconstruction terms of the V-system method and the hierarchical V-system method in one example embodiment are compared and are shown in FIGS. 10, 13, 16 and 20 for the different images shown in FIGS. 11, 14, 17 and 18 respectively. It is shown that the reconstruction terms of the hierarchical V-system method in one example embodiment are fewer than the V-system method (degree 1, 2, 3) if the multi-objects are same. The accurate reconstruction can be obtained by the hierarchical V-system method in one example embodiment.

Two standard shape databases are used. The first is the well-known MPEG-7 shape database which consists of 1400 images semantically classified into 70 classes. The shapes of this database are derived from natural objects, man-made objects, objects extracted from cartoons, and manually-drawn objects under various rigid and nonrigid deformations. The importance of this database is due to the fact that it is the only set that is used to objectively evaluate the performance of various shape descriptors. The other database is the Kimias database which contains 99 images for 9 categories. There are 11 images for each category and most of the images are partially occluded. 32 images are randomly selected from these two databases, as are shown in FIGS. 11, 14, 17 and 18.

Figure 9:
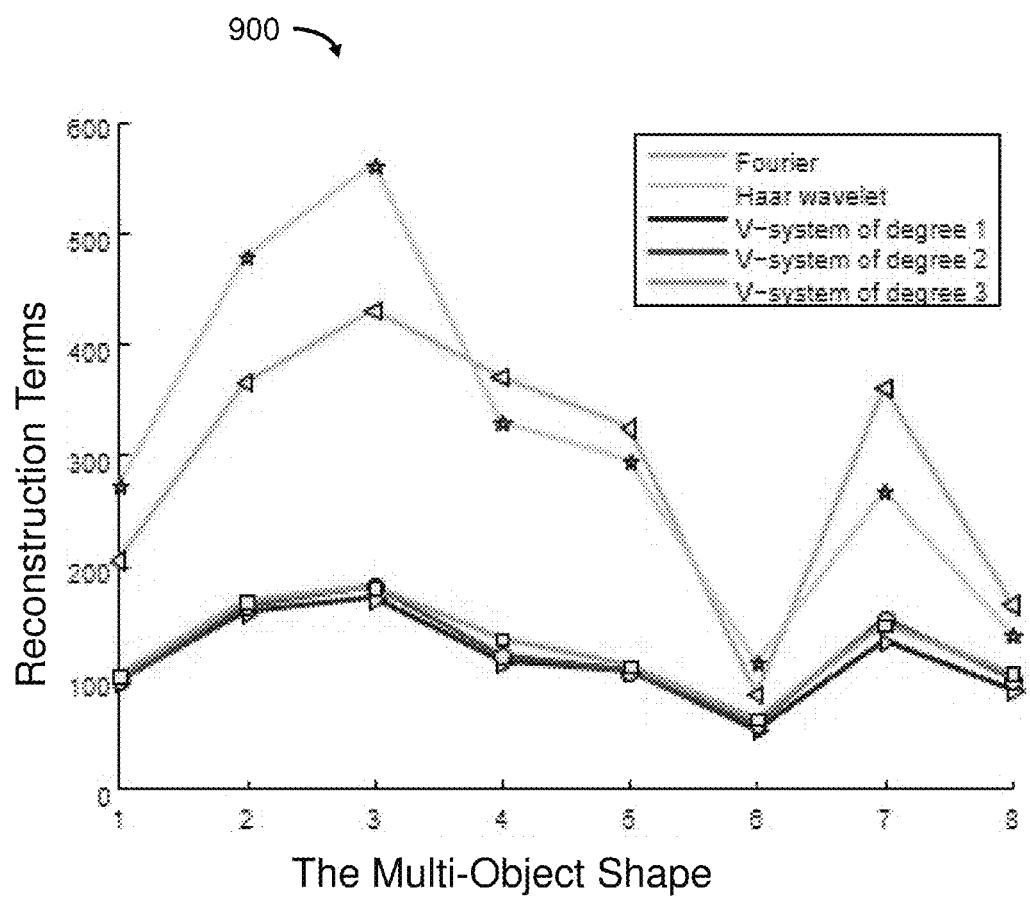
FIG. 9 shows the reconstruction terms of the Fourier method, the Harr wavelet method, the V-system of degree 1, the V-system of degree 2 and the V-system of degree 3 for different images shown in FIG. 11.
Figure 10:
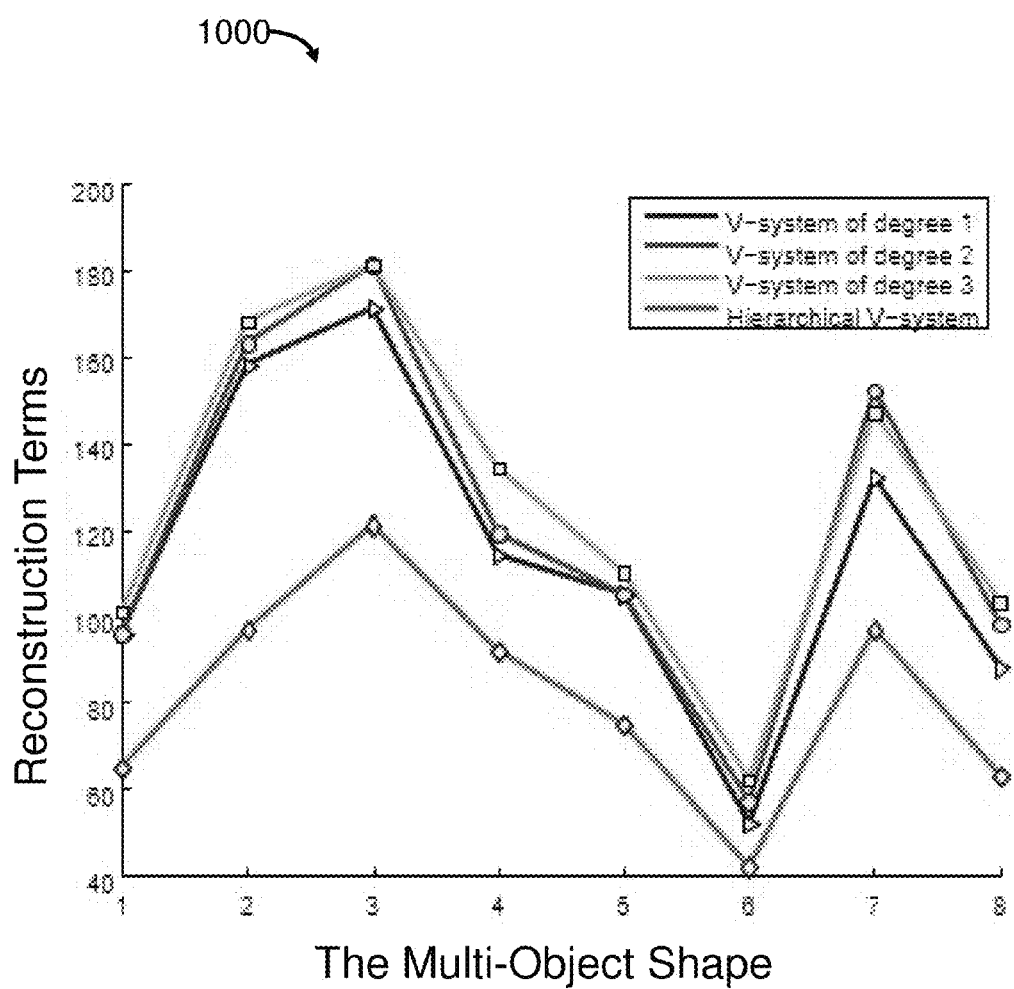
FIG. 10 shows the reconstruction terms of the V-system of degree 1, the V-system of degree 2, the V-system of degree 3 and the hierarchical V-system method for different images shown in FIG. 11 in accordance with an example embodiment.
Figure 11:
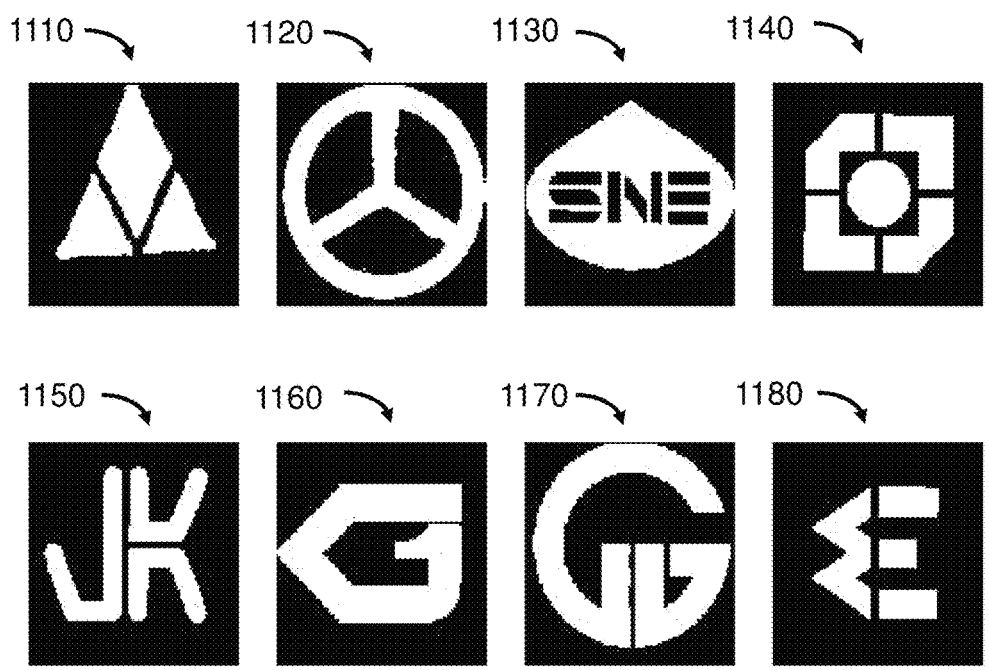
FIG. 11 shows multi-object images in accordance with an example embodiment.
Figure 12:
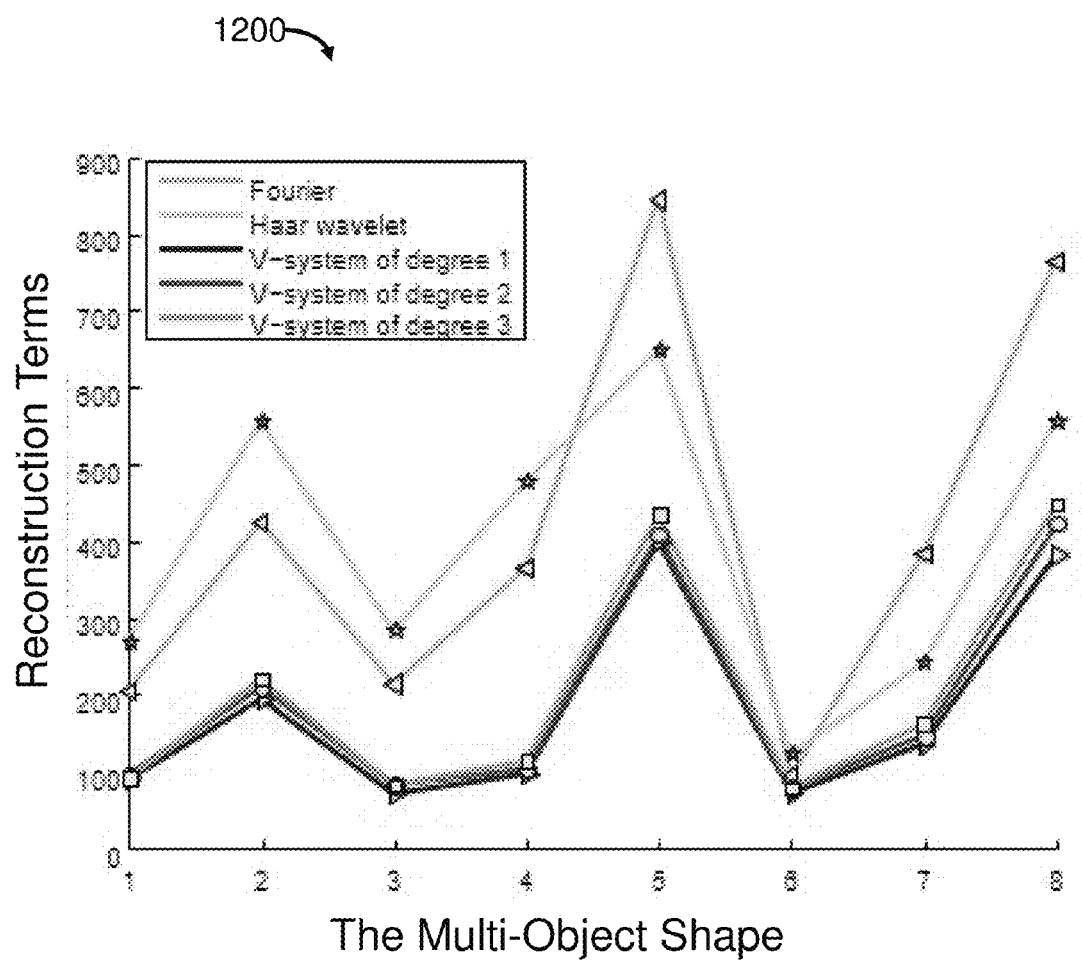
FIG. 12 shows the reconstruction terms of the Fourier method, the Harr wavelet method, the V-system of degree 1, the V-system of degree 2 and the V-system of degree 3 for different images shown in FIG. 14.
Figure 13:
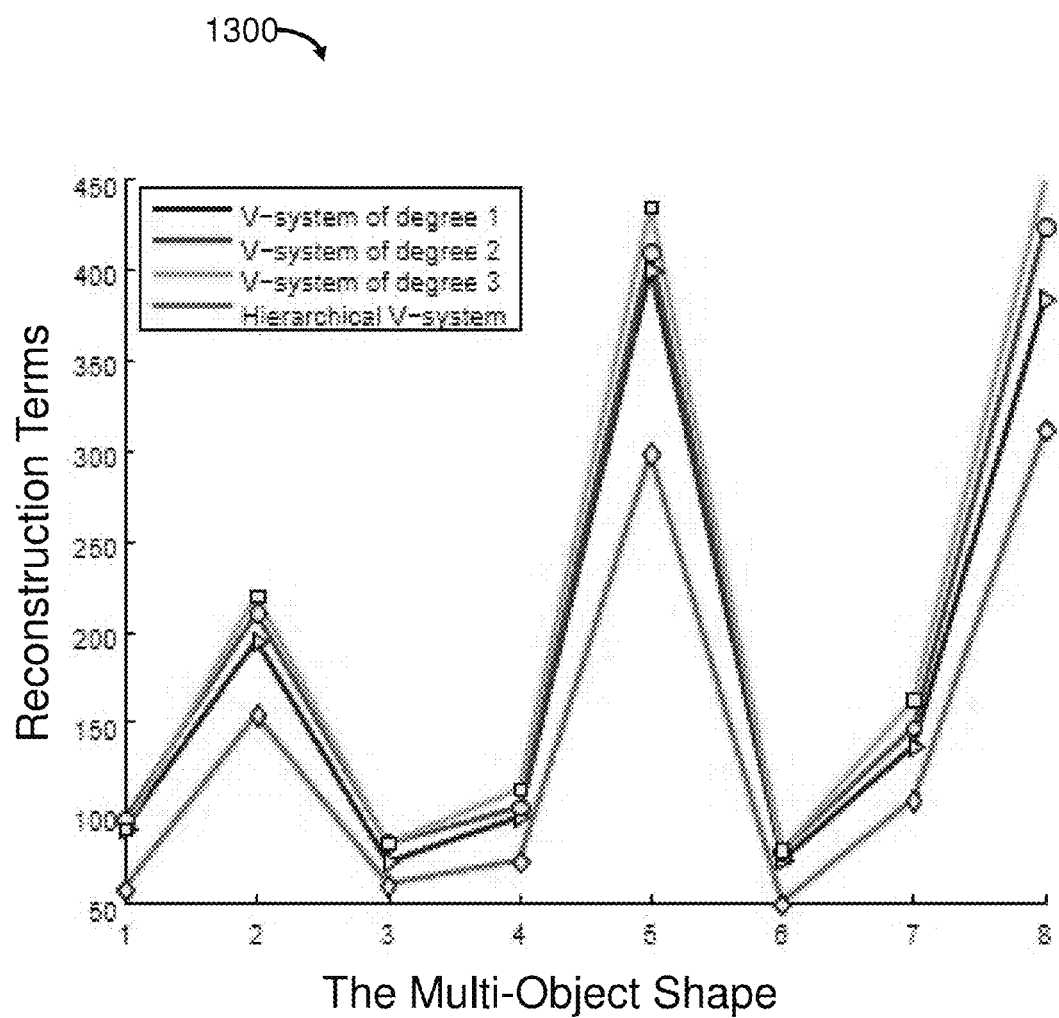
FIG. 13 shows the reconstruction terms of the V-system of degree 1, the V-system of degree 2, the V-system of degree 3 and the hierarchical V-system method for different images shown in FIG. 14 in accordance with an example embodiment.
Figure 14:
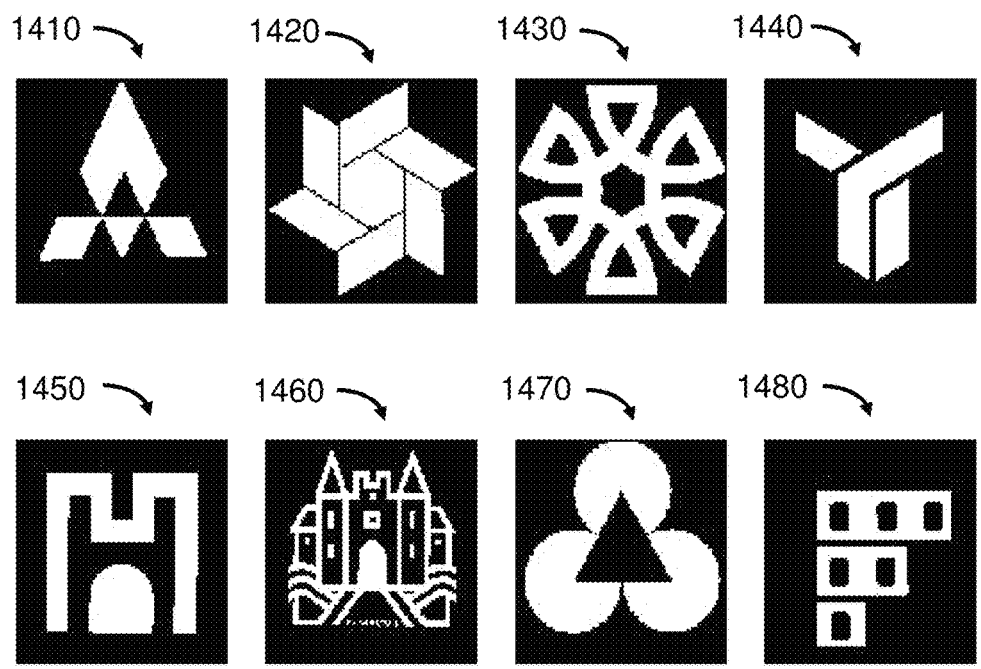
FIG. 14 shows multi-object images in accordance with an example embodiment.
Figure 15:
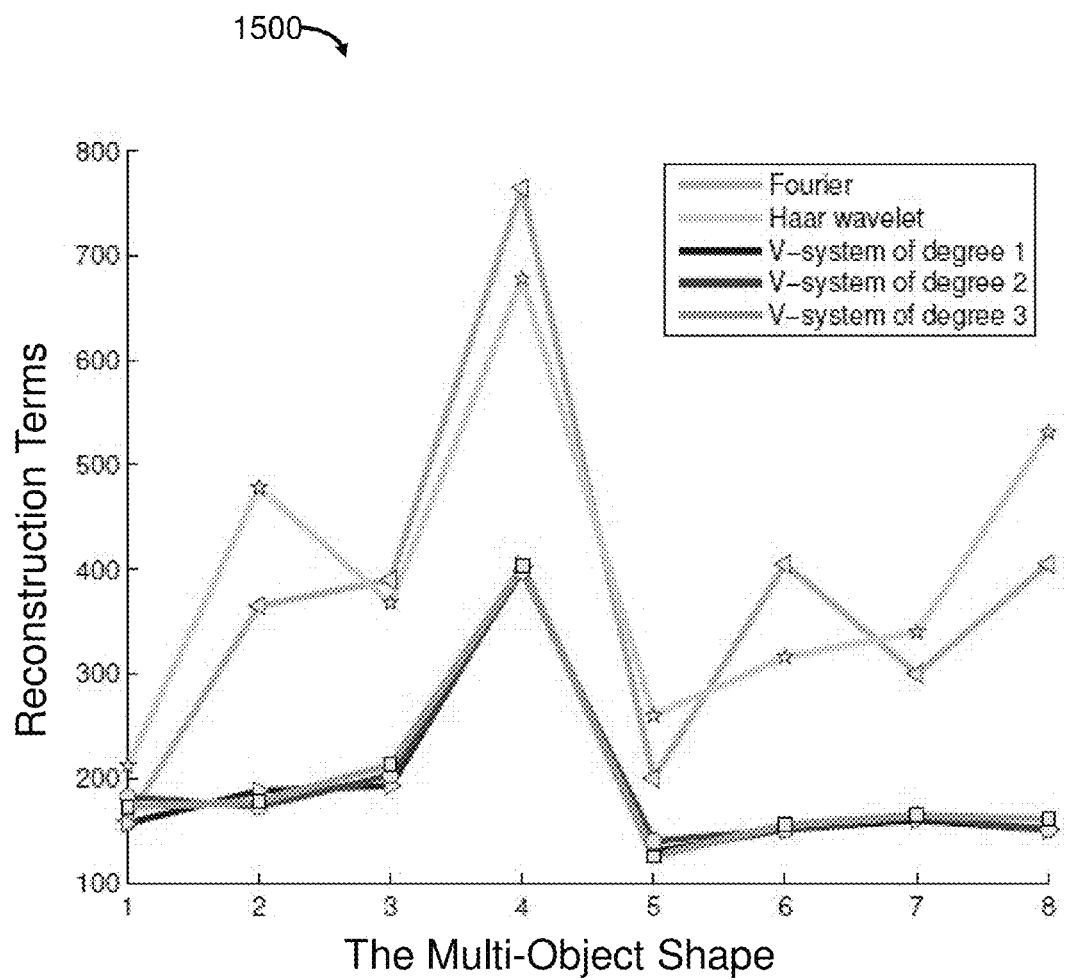
FIG. 15 shows the reconstruction terms of the Fourier method, the Harr wavelet method, the V-system of degree 1, the V-system of degree 2 and the V-system of degree 3 for different images shown in FIG. 17.
Figure 16:
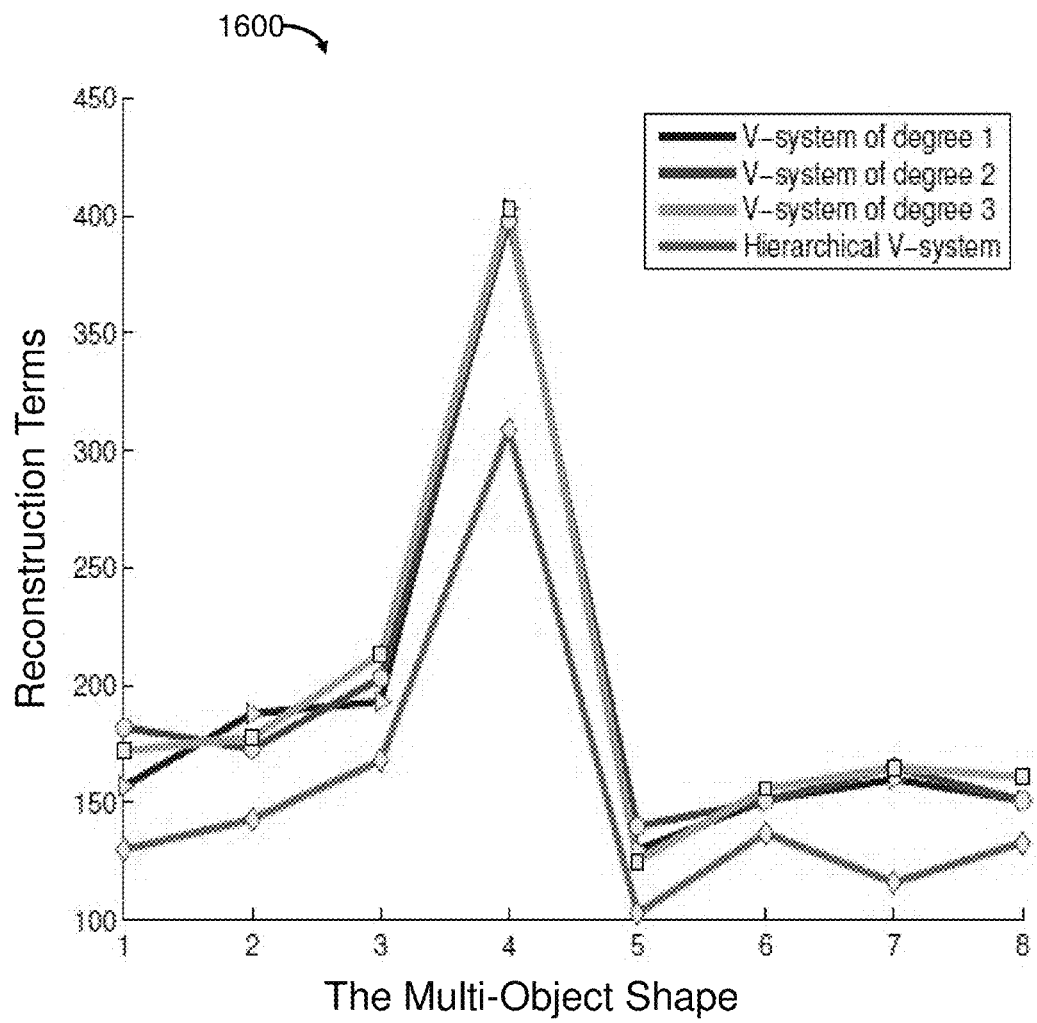
FIG. 16 shows the reconstruction terms of the V-system of degree 1, the V-system of degree 2, the V-system of degree 3 and the hierarchical V-system method for different images shown in FIG. 17 in accordance with an example embodiment.
Figure 17:
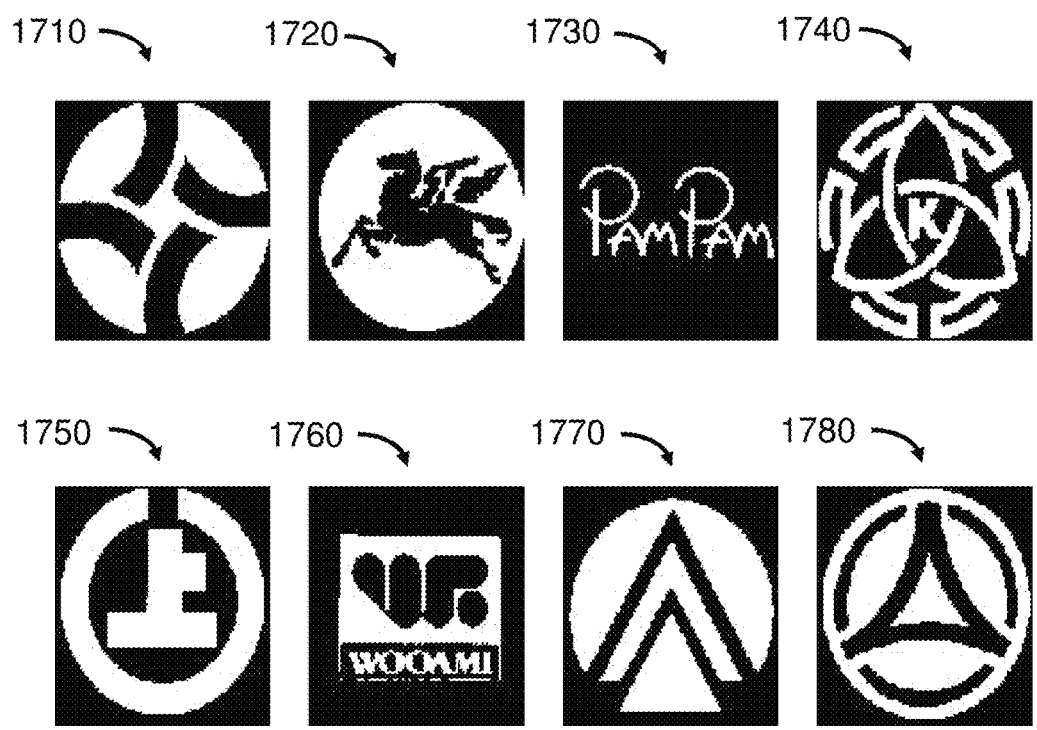
FIG. 17 shows multi-object images in accordance with an example embodiment.
Figure 18:
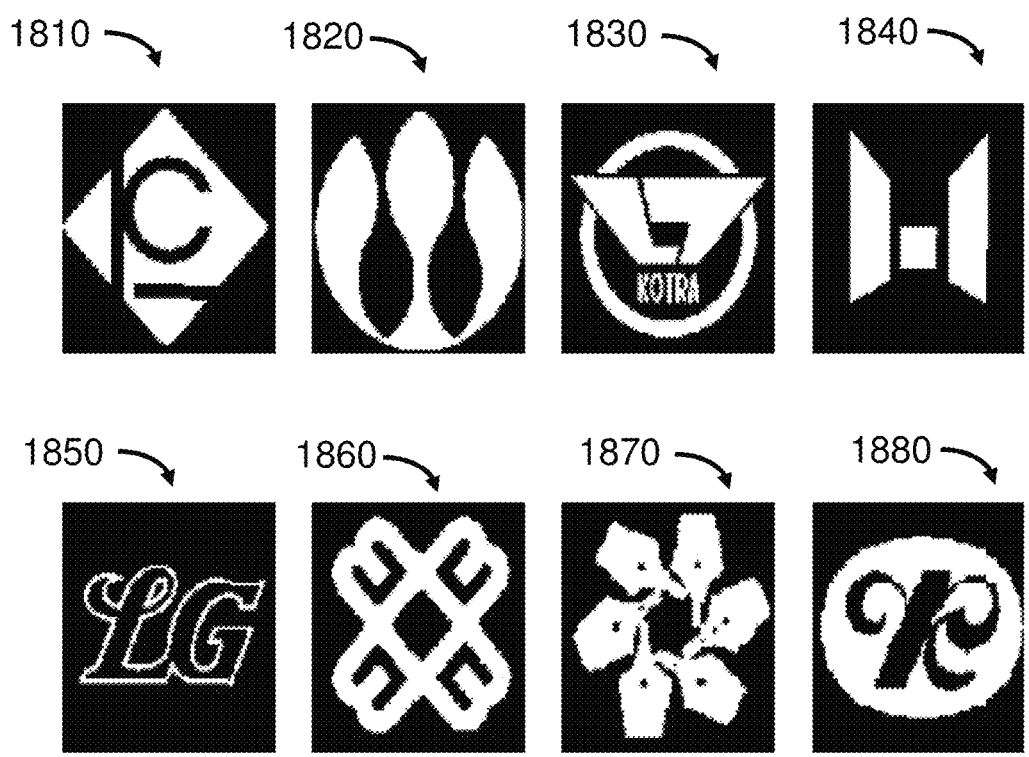
FIG. 18 shows multi-object images in accordance with an example embodiment.
Figure 19:
FIG. 19 shows the reconstruction terms of the Fourier method, the Han wavelet method, the V-system of degree 1, the V-system of degree 2 and the V-system of degree 3 for different images shown in FIG. 18.
Figure 20:
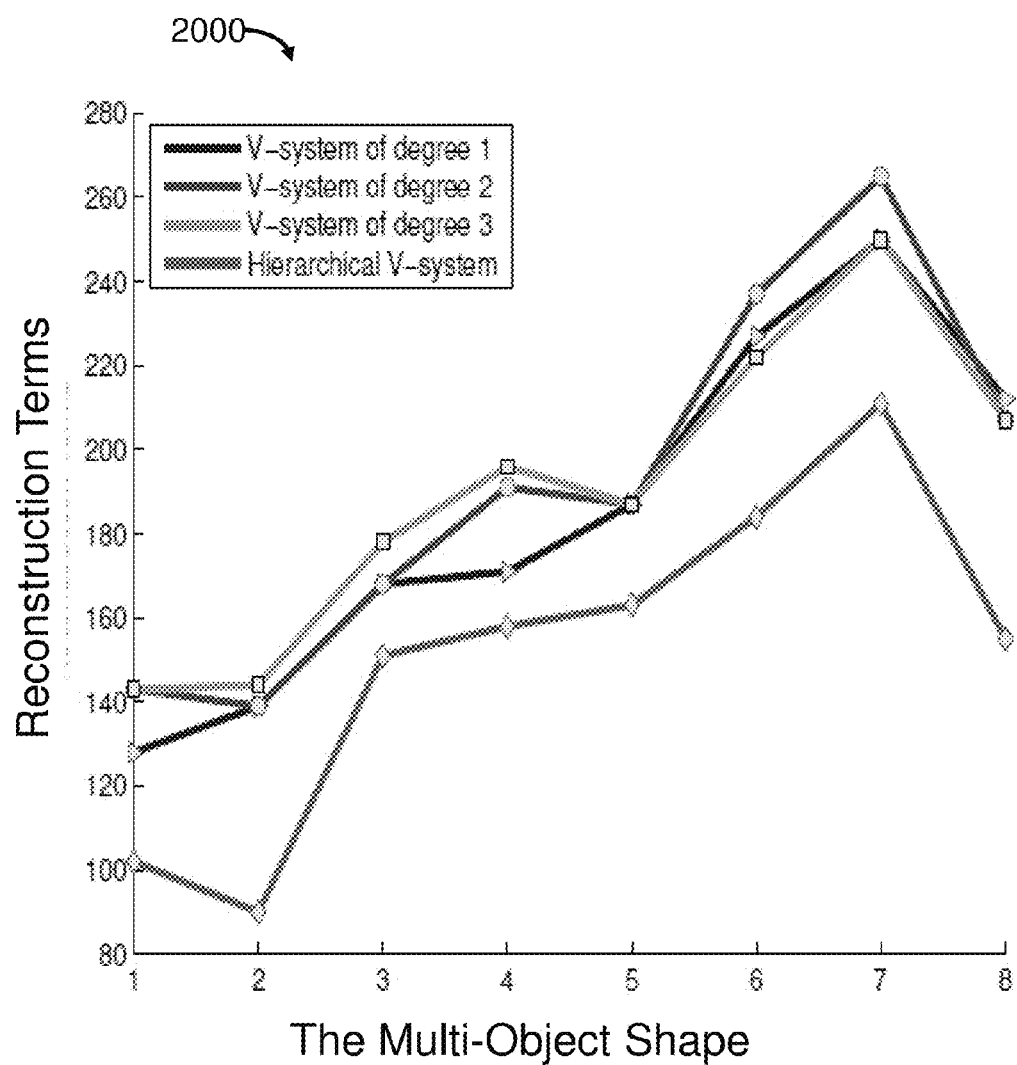
FIG. 20 shows the reconstruction terms of the V-system of degree 1, the V-system of degree 2, the V-system of degree 3 and the hierarchical V-system method for different images shown in FIG. 18 in accordance with an example embodiment.

For FIGS. 9, 10, 12, 13, 15, 16, 19 and 20, the horizontal axis represents different multi-object images and the vertical axis represents the number of reconstruction terms. The number "1", "2", "3", "4", "5", "6", "7" and "8" on the horizontal axis in FIGS. 9 and 10 represent the multi-object image 1110, 1120, 1130, 1140, 1150, 1160, 1170 and 1180 respectively in FIG. 11. The number "1", "2", "3", "4", "5", "6", "7" and "8" on the horizontal axis in FIGS. 12 and 13 represent the multi-object image 1410, 1420, 1430, 1440, 1450, 1460, 1470 and 1480 respectively in FIG. 14. The number "1", "2", "3", "4", "5", "6", "7" and "8" on the horizontal axis in FIGS. 15 and 16 represent the multi-object image 1710, 1720, 1730, 1740, 1750, 1760, 1770 and 1780 respectively in FIG. 17. The number "1", "2", "3", "4", "5", "6", "7" and "8" on the horizontal axis in FIGS. 19 and 20 represent the multi-object image 1810, 1820, 1830, 1840, 1850, 1860, 1870 and 1880 respectively in FIG. 18.

Thus, the effectiveness of the methods in example embodiments is verified. The experiments show that the orthogonal representation of multi-object shape with hierarchical V-system method has no Gibbs phenomenon with finite terms, and the number of reconstruction terms with hierarchical V-system method for representing the multi-object shape are fewer than the V-system method, the Fourier method and the Haar wavelet method under the same accurate representation.

A feature with the invariance in rotation, translation and scale transforms is very important for multi-object shape retrieval. The rotation, translation and scale transforms of hierarchical V-system, called the descriptors of hierarchical V-system are discussed. Given a multi-object shape with $2^n$ pieces in 2D space, the horizontal $x(t)$ and the vertical $y(t)$ coordinates of the contour points can be expressed as $$P(t) = x(t) + iy(t),$$

where $i = \sqrt{-1}$.

Uniformly partition $[0,1]$ into $2^n$ subintervals $$I_j = \left[\frac{j}{2^n}, \frac{j+1}{2^n}\right]$$

for $j = 0, 1, \ldots, 2^n - 1$, and respectively map $x(t)$ and $y(t)$ onto the subintervals below $$\begin{cases} x(t) = x_j(t), \text{ if } t \in I_j \\ y(t) = y_j(t), \text{ if } t \in I_j \end{cases}, j = 0, 1, 2, \ldots, 2^n - 1,$$

where $x_j(t)$ and $y_j(t)$ are the polynomials of degree k over the interval $I_j$. By the reproducibility of the V-series and a polynomial of degree k has k+1 coefficients, $$P(t) = x(t) + iy(t) = \sum_{k=0}^{h} \sum_{j=0}^{N_h} a_x^{(k)j} V_j^{(k)}(t) + i \sum_{k=0}^{h} \sum_{j=0}^{N_k} a_y^{(k)j} V_j^{(h)}(t),$$

where $$\begin{cases} a_x^{(k)j} = \int_0^1 x(t) V_j^{(k)}(t) dt, \\ a_y^{(k)j} = \int_0^1 y(t) V_j^{(k)}(t) dt, \end{cases}$$

for $j = 0, 1, 2, \ldots, 2^n - 1$. Denote $a^{(k)}(j) = a_x^{(k)j} + i a_y^{(k)j}$, then $a^{(k)}(j)$ is called as the j-th descriptors of $P(t)$. By $$a^{(k)}(j) = \int_0^1 x(t) V_j^{(k)}(t) dt + i \int_0^1 y(t) V_j^{(h)}(t) dt$$
$$= \int_0^1 P(t) V_j^{(k)}(t) dt,$$

Thus, $$P(t) = \sum_{k=0}^{h} \sum_{j=0}^{N_h} a^{(k)}(j) V_j^{(k)}(t).$$

Furthermore, the energy of the multi-object shape $P(t)$ is defined as:

$$E = \sum_{j=0}^{N_h} \|a^{(k)}(j)\|^{\frac{1}{2}}.$$

Since the orthogonal transformation preserves the length, the above energy E is invariant in rotation for the same multi-object shape. By this feature, recognition and classification on the multi-object shape graph set are conducted. In the retrieval of multi-object shape, defining the normalized descriptors of the hierarchical V-system is important. In order to make the descriptors satisfy the invariance in rotation, translation and scale transforms, it can be defined normalized descriptors as following: Let $$D(j) = \frac{\|a^{(k)}(j)\|}{\|a^{(k)}(1)\|}, j = 1, 2, \ldots,$$

then $D(j)$ are called the j-th unified descriptors of $P(t)$. Especially, when $j=0$, It is called $^{(k)}(0)$ as "DC" term.

Theorem (1): For $j=0, 1, 2, \ldots$, via a shifting transformation $z_0$, a scaling transformation $\beta$ and a rotation transformation $\vartheta$, the descriptors $a^k(j)$ of $P(t)$ can be transformed into $$\overline{a}^{(k)}(j) = \beta e^{i\vartheta} [a^{(k)}(j) + z_0 \varrho(j)], \text{ where}$$

$$\varrho(j) = \begin{cases} 0, j \neq 0, \\ 1, j = 0, \end{cases}$$

Theorem (2): The unified descriptors $D(j), j=1, 2, \ldots$ are invariant under shifting, scaling and rotation transformations.

To proof Theorem (1), let the shifting displacement be $z_0$, the scaling be $\beta$ and the rotation angle be $\vartheta$, then the new object is of the form $P_1(t) = \beta e^{b\vartheta}(P(t) + z_0)$, and its descriptors are as follows $$\overline{a}^{(k)}(j) = \int_0^1 \beta e^{i\vartheta} (P(t) + z_0) V_j^{(k)}(t) dt$$
$$= \beta e^{i\vartheta} \left( \int_0^1 P(t) V_j^{(k)}(t) dt + \int_0^1 z_0 V_j^{(k)}(t) dt \right)$$
$$= \beta e^{i\vartheta} [a^{(k)}(j) + z_0 \varrho(j)],$$

where $$\int_0^1 V_j^{(k)}(t) dt = \varrho(j) = \begin{cases} 0, j \neq 0 \\ 1, j = 0. \end{cases},$$

To proof Theorem (2) for j=1, 2, . . . , it follows from (1) that $\bar{a}^{(k)}(j)=\beta e^{i\Theta}a^{(k)}(j)$, furthermore $$\bar{D}(j) = \frac{\|\bar{a}^{(k)}(j)\|}{\|\bar{a}^{(k)}(1)\|} = \frac{\|a^{(k)}(j)\|}{\|a^{(k)}(1)\|} = D(j),$$

Let $D_A(j)$ and $D_B(j)$ be the unified descriptors of two objects A and B expressed by piecewise polynomials, there exists a number N such that A and B can be exactly expressed by the N terms of the V-system. Therefore, the distance of the objects A and B are defined as follows $$\Upsilon = \sqrt{\sum_{j=2}^{N} \|D_A(j) - D_B(j)\|^2}.$$

By means of the concept of the distance of two objects, how similar the objects are is approximately measured, furthermore, the objects with the property of shifting, scaling and rotation invariance are recognized. The bigger distance $\Upsilon$ is, the bigger the difference of two objects' shapes is. $\Upsilon=0$ means the shapes of the two models are identical.

The normalized descriptors of the hierarchical V-system method in one example embodiment satisfy the invariance of rotation, translation and scale transforms. The experimental results show that the orthogonal representation of multi-object shape with the hierarchical V-system method in one example embodiment can be represented by finite terms and has no Gibbs phenomenon. The normalized descriptors of hierarchical V-system based on the invariance in rotation, translation and scale transforms provide a good method for multi-object retrieval. The descriptors of hierarchical V-system and its normalization are defined. The corresponding proving process is given, and the invariance in rotation, translation and scale transforms of the normalized hierarchical V-system descriptors are theoretically proved.

APPENDIX

The general terms of the V-system are shown below:
Let the functions $V_{k,1}^1(x), V_{k,1}^2(x), \ldots, V_{k,1}^{k+1}(x)$ be the first (k+1) Legendre polynomials on the interval [0,1] and construct the function generator $F(x)=\{V_{k,2}^i(x)\}_1^{k+1}$, any two functions in the set F(x) are orthogonal each other, and any one function in F(x) is orthogonal with:

$$V_{k,1}^1(x), V_{k,1}^2(x), \ldots, V_{k,1}^{k+1}(x).$$

Let $$V_{k,n}^{i,j}(x) = \begin{cases} \sqrt{2^{n-2}} V_{k,2}^i\left[2^{n-2}\left(x - \frac{j-1}{2^{n-2}}\right)\right], & x \in \left(\frac{j-1}{2^{n-2}}, \frac{j}{2^{n-2}}\right), \\ 0, & \text{others,} \end{cases}$$

where
i=1, 2, . . . , k+1, j=1, 2, . . . , $2^{n-2}$, n=3, 4, 5, . . . .
This is the V-system of degree k.
In particular, when k=0, the V-system is $$V_{0,1}^1(x) = 1, x \in [0, 1],$$

$$V_{0,2}^1(x) = \begin{cases} 1, & x \in \left[0, \frac{1}{2}\right) \\ -1, & x \in \left[\frac{1}{2}, 1\right]. \end{cases}$$

The general terms of the V-system of degree 2 are given by $$V_{0,n}^{1,j}(x) = \begin{cases} \sqrt{2^{n-2}} V_{0,2}^1\left[2^{n-2}\left(x - \frac{j-1}{2^{n-2}}\right)\right], \\ x \in \left(\frac{j-1}{2^{n-2}}, \frac{j}{2^{n-2}}\right), \\ 0, \\ \text{others,} \end{cases}$$

where j=1, 2, . . . , 2n−2, and n=3, 4, . . . . Obviously, the V-system of degree 0 is the Haar wavelet system.
For k=1, the V-system is $$V_{1,1}^1(x) = 1, x \in [0, 1],$$

$$V_{1,1}^2(x) = \sqrt{3}(1 - 2x), x \in [0, 1],$$

$$V_{1,2}^1(x) = \begin{cases} \sqrt{3}(1 - 4x), x \in \left[0, \frac{1}{2}\right), \\ \sqrt{3}(4x - 1), x \in \left[\frac{1}{2}, 1\right] \end{cases}$$

$$V_{1,2}^2(x) = \begin{cases} 1 - 6x, x \in \left[0, \frac{1}{2}\right), \\ 5 - 6x, x \in \left[\frac{1}{2}, 1\right]. \end{cases}$$

The general terms of the V-system of degree 1 are given by $$V_{1,n}^{1,j}(x) = \begin{cases} \sqrt{2^{n-2}} V_{1,2}^1\left[2^{n-2}\left(x - \frac{j-1}{2^{n-2}}\right)\right], \\ x \in \left(\frac{j-1}{2^{n-2}}, \frac{j}{2^{n-2}}\right), \\ 0, \\ \text{others,} \end{cases}$$

$$V_{1,n}^{2,j}(x) = \begin{cases} \sqrt{2^{n-2}} V_{1,2}^2\left[2^{n-2}\left(x - \frac{j-1}{2^{n-2}}\right)\right], \\ x \in \left(\frac{j-1}{2^{n-2}}, \frac{j}{2^{n-2}}\right), \\ 0, \\ \text{others.} \end{cases}$$

where j=1, 2, . . . , 2n−2, and n=3, 4, . . . .
For k=2, the V-system is $$V_{2,1}^1(x) = 1, x \in [0, 1],$$

$$V_{2,1}^2(x) = \sqrt{3}(1 - 2x), x \in [0, 1],$$

$$V_{2,1}^3(x) = \sqrt{5}(6x^2 - 6x + 1), x \in [0, 1],$$

$$V_{2,2}^1(x) = \begin{cases} \sqrt{5}\,(16x^2 - 10x + 1), & x \in \left[0, \frac{1}{2}\right), \\ \sqrt{5}\,[-16(1-x)^2 + 10(1-x) - 1], & x \in \left[\frac{1}{2}, 1\right], \end{cases}$$

$$V_{2,2}^2(x) = \begin{cases} \sqrt{3}\,(30x^2 - 14x + 1), & x \in \left[0, \frac{1}{2}\right), \\ \sqrt{3}\,[30(1-x)^2 - 14(1-x) + 1], & x \in \left[\frac{1}{2}, 1\right], \end{cases}$$

$$V_{2,2}^3(x) = \begin{cases} 40x^2 - 16x + 1, & x \in \left[0, \frac{1}{2}\right), \\ -40(1-x)^2 + 16(1-x) - 1, & x \in \left[\frac{1}{2}, 1\right]. \end{cases}$$

The general terms of the V-system of degree 2 are given by $$V_{2,n}^{1,j}(x) = \begin{cases} \sqrt{2^{n-2}}\, V_{2,2}^1\!\left[2^{n-2}\!\left(x - \frac{j-1}{2^{n-2}}\right)\right], \\ \quad x \in \left(\frac{j-1}{2^{n-2}}, \frac{j}{2^{n-2}}\right), \\ 0, \\ \quad \text{others,} \end{cases}$$

$$V_{2,n}^{2,j}(x) = \begin{cases} \sqrt{2^{n-2}}\, V_{2,2}^2\!\left[2^{n-2}\!\left(x - \frac{j-1}{2^{n-2}}\right)\right], \\ \quad x \in \left(\frac{j-1}{2^{n-2}}, \frac{j}{2^{n-2}}\right), \\ 0, \\ \quad \text{others,} \end{cases}$$

$$V_{2,n}^{3,j}(x) = \begin{cases} \sqrt{2^{n-2}}\, V_{2,2}^3\!\left[2^{n-2}\!\left(x - \frac{j-1}{2^{n-2}}\right)\right], \\ \quad x \in \left(\frac{j-1}{2^{n-2}}, \frac{j}{2^{n-2}}\right), \\ 0, \\ \quad \text{others,} \end{cases}$$

where $j = 1, 2, \ldots, 2^{n-2}$, and $n = 3, 4, \ldots$.

For k=3, the V-system is $$V_{3,1}^1(x) = 1,\ x \in [0, 1],$$

$$V_{3,1}^2(x) = \sqrt{3}\,(1 - 2x),\ x \in [0, 1],$$

$$V_{3,1}^3(x) = \sqrt{5}\,(6x^2 - 6x + 1),\ x \in [0, 1],$$

$$V_{3,1}^4(x) = \sqrt{7}\,(-20x^3 + 30x^2 - 12x + 1),\ x \in [0, 1]$$

$$V_{3,2}^1(x) = \begin{cases} \sqrt{7}\,(-64x^3 + 66x^2 - 18x + 1), \\ \quad x \in \left[0, \frac{1}{2}\right), \\ \sqrt{7}\,[-64(1-x)^3 + 66(1-x)^2 - \\ \quad 18(1-x) + 1],\ x \in \left[\frac{1}{2}, 1\right], \end{cases}$$

$$V_{3,2}^2(x) = \begin{cases} \sqrt{5}\,(-140x^3 + 114x^2 - 24x + 1), \\ \quad x \in \left[0, \frac{1}{2}\right), \\ \sqrt{5}\,[140(1-x)^3 - 114(1-x)^2 + \\ \quad 24(1-x) - 1],\ x \in \left[\frac{1}{2}, 1\right], \end{cases}$$

$$V_{3,2}^3(x) = \begin{cases} \sqrt{3}\,(-224x^3 + 156x^2 - 28x + 1), \\ \quad x \in \left[0, \frac{1}{2}\right), \\ \sqrt{3}\,[-224(1-x)^3 + 156(1-x)^2 - \\ \quad 28(1-x) + 1],\ x \in \left[\frac{1}{2}, 1\right], \end{cases}$$

$$V_{3,2}^4(x) = \begin{cases} -280x^3 + 180x^2 - 30x + 1, \\ \quad x \in \left[0, \frac{1}{2}\right), \\ 280(1-x)^3 - 180(1-x)^2 + \\ \quad 30(1-x) - 1,\ x \in \left[\frac{1}{2}, 1\right]. \end{cases}$$

The general terms of the V-system of degree 3 are given by $$V_{3,n}^{1,j}(x) = \begin{cases} \sqrt{2^{n-2}}\, V_{3,2}^1\!\left[2^{n-2}\!\left(x - \frac{j-1}{2^{n-2}}\right)\right], \\ \quad x \in \left(\frac{j-1}{2^{n-2}}, \frac{j}{2^{n-2}}\right), \\ 0, \\ \quad \text{others.} \end{cases}$$

$$V_{3,n}^{2,j}(x) = \begin{cases} \sqrt{2^{n-2}}\, V_{3,2}^2\!\left[2^{n-2}\!\left(x - \frac{j-1}{2^{n-2}}\right)\right], \\ \quad x \in \left(\frac{j-1}{2^{n-2}}, \frac{j}{2^{n-2}}\right), \\ 0, \\ \quad \text{others.} \end{cases}$$

$$V_{3,n}^{3,j}(x) = \begin{cases} \sqrt{2^{n-2}}\, V_{3,2}^3\!\left[2^{n-2}\!\left(x - \frac{j-1}{2^{n-2}}\right)\right], \\ \quad x \in \left(\frac{j-1}{2^{n-2}}, \frac{j}{2^{n-2}}\right), \\ 0, \\ \quad \text{others.} \end{cases}$$

$$V_{3,n}^{4,j}(x) = \begin{cases} \sqrt{2^{n-2}}\, V_{3,2}^4\!\left[2^{n-2}\!\left(x - \frac{j-1}{2^{n-2}}\right)\right], \\ \quad x \in \left(\frac{j-1}{2^{n-2}}, \frac{j}{2^{n-2}}\right), \\ 0, \\ \quad \text{others.} \end{cases}$$

where $j = 1, 2, \ldots, 2^{n-2}$, and $n = 3, 4, \ldots$.

Figure 21:
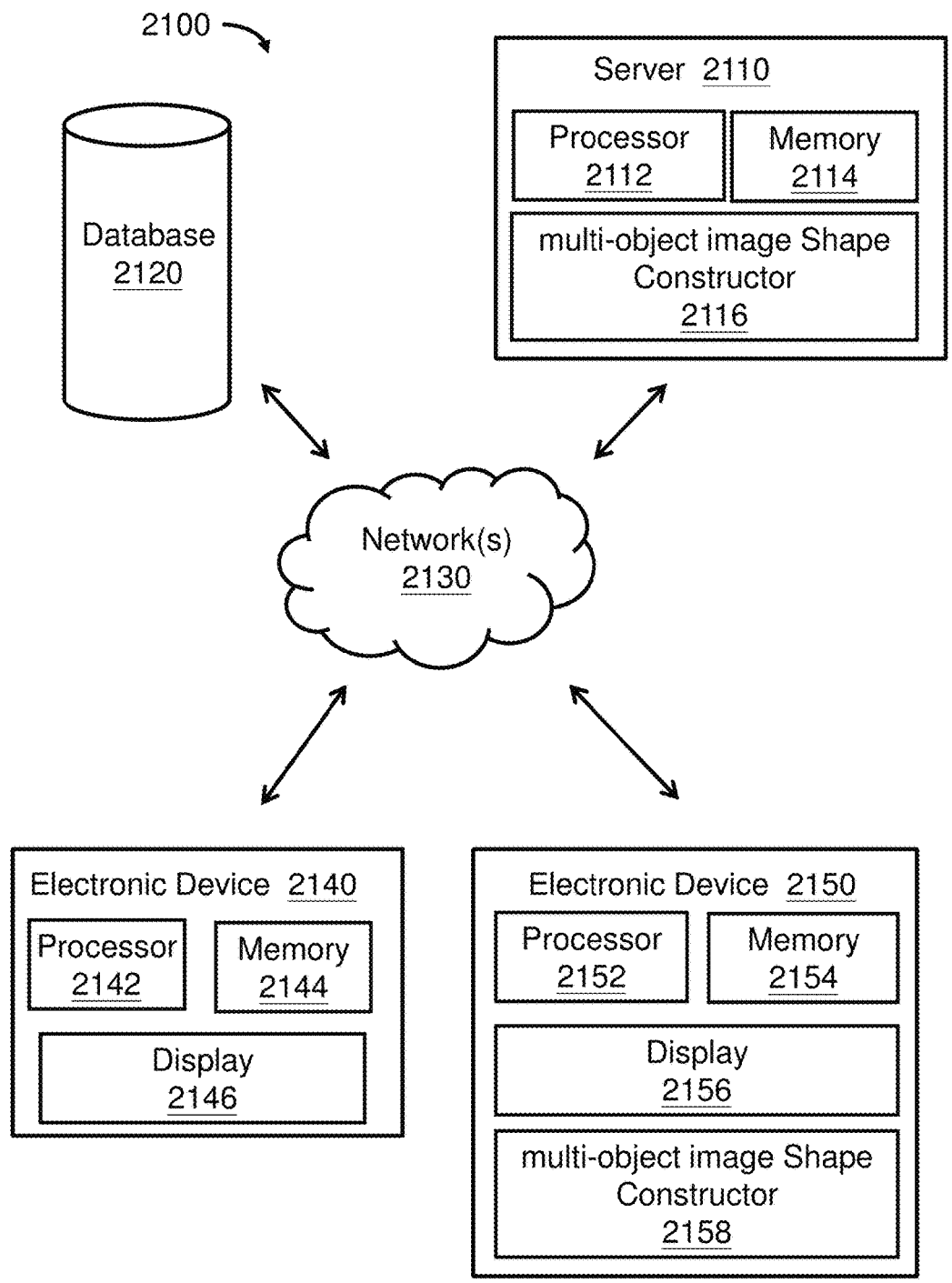
FIG. 21 shows a computer system that executes and generates geometrical model for a multi-object image using finite terms in accordance with an example embodiment.

FIG. 21 shows a computer system 2100 that executes and generates geometrical model for a multi-object image using finite terms. The computer system 2100 includes one or more of a server 2110, a database 2120, and one or more of an electronic device 2140 or 2150 in communication via one or more networks 2130.

The server 2110 includes a processor or processing unit 2112, a memory 2114, and a multi-object image shape constructor 2116.

The electronic device 2140 includes one or more of a processor or processing unit 2142, memory 2144 and display 2146. The electronic device 2150 includes one or more of a processor or processing unit 2152, memory 2154, display 2156 and multi-object image shape constructor 2158 for reconstructing the multi-object image in one example embodiment. Examples of an electronic device include, but are not limited to, laptop computers, desktop computers, tablet computers, handheld portable electronic devices (HPEDs), and other portable and non-portable electronic devices.

The database 2120 includes electronic storage or memory and can store data or other information to assist in executing example embodiments.

The network(s) 2130 can include one or more of a wired network or wireless network, such as the internet, cellular network, etc.

The processor, memory, and multi-object image shape constructor in the server 2110 and/or electronic device 2140 and/or electronic device 2150 execute methods in accordance with example embodiments. The multi-object image shape constructor can include software and/or specialized hardware to execute example embodiments.

The processor unit includes a processor (such as a central processing unit, CPU, microprocessor, microcontrollers, field programmable gate array (FPGA), application-specific integrated circuit (ASIC), etc.) for controlling the overall operation of memory (such as random access memory (RAM) for temporary data storage, read only memory (ROM) for permanent data storage, and firmware). The processing unit and TB model map constructor communicate with each other and memory and perform operations and tasks that implement one or more blocks of the flow diagrams discussed herein. The memory, for example, stores applications, data, programs, algorithms (including software to implement or assist in implementing example embodiments) and other data.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

As used herein, "computer resources" are any physical or virtual component of limited availability within a computer system. For example, physical component includes any device connected to a computer system and any internal system component, virtual component includes any files, network connections and memory areas.

The Daubechies wavelets, based on the work of Ingrid Daubechies, are a family of orthogonal wavelets defining a discrete wavelet transform and characterized by a maximal number of vanishing moments for some given support. With each wavelet type of this class, there is a scaling function (called the father wavelet) which generates an orthogonal multiresolution analysis. In general, the Daubechies wavelets are chosen to have the highest number A of vanishing moments, for given support width 2A−1. When A is equal to 2, that is the "Daubechies-2(db2) wavelet" as used herein.

As used herein, "multi-object image" has two or more sufficiently separated objects in an image include continuous and discontinuous graphics.

As used herein, "orthogonality" has following definition. By using integral calculus, it is common to use the following to define the inner product of two functions $f$ and 9.

$$\langle f, g \rangle = \int_a^b f(x)g(x)dx,$$

$f$ and g are orthogonal (with respect to this inner product) if the value of this integral is zero:

$$\int_a^b f(x)g(x)dx = 0.$$

As used herein, "orthogonal representation" has following definition. Function F(t) is defined as the function of a multi-object shape. When we use V-system to represent the multi-object shape, it can be express as $$F = \sum_{i=1}^n a_i^{(k)} V_i^{(k)}$$

where $a^{(k)}$ is reconstruction coefficient, $V^{(k)}$ is the V-system of degree k.

Because V-system is a complete orthogonal system of functions defined on the interval [0, 1], the above expression is the orthogonal representation for a multi-object shape.

What is claimed is:

1. A method that reduces consumption of computer resources in a computer system to reconstruct a shape of a multi-object image using finite terms, the method comprising:

converting, by the computer system, the multi-object image into a binary image;

blurring, by the computer system, the binary image by applying a Gaussian blur to the binary image;

determining, by the computer system, a contour of the binary image by removing an area of the binary image which is less than an area threshold;

approximating, by the computer system, the contour of the binary image with a plurality of points;

selecting, by the computer system, coordinates of the plurality of points that represent the shape of the multi-object image;

generating, by the computer system, a function F(t) of the shape of the multi-object image based on the coordinates;

calculating, by the computer system, an initial function $f_0$ that approximates the shape of the multi-object image by performing V-system of degree 0, $V_i^{(0)}$, to the function F(t) of the shape of the multi-object image, wherein $f_0$ is expressed as:

$$f_0 = \sum_{i=1}^{N_1} a_i^{(0)} V_i^{(0)};$$

calculating, by the computer system, an approximated function $r_1$ by $r_1 = F(t) - f_0$, wherein the approximated function $r_1$ represents an error between the initial function and the function of the shape of the multi-object image;

calculating, by the computer system, a norm of function $\|r_1\|$;

determining, by the computer system, a reconstruction term $N_1$ when $\|r_1\|$ is smaller than a predetermined threshold $\varepsilon$;

performing, by the computer system, a hierarchical iteration from k=2 to k=h, wherein a norm $\|r_k\|$ of an approximated function $r_k$ equals to zero for k=h such that the hierarchical iteration ends and thereby the consumption of computer resources is reduced, the hierarchical iteration includes:

calculating, by the computer system, the approximated function $r_k$ that approximates the shape of the multi-object image by performing V-system of degree k, $V_i^{(k)}$, to F(t), wherein $r_k$ is expressed as:

$$r_k = r_{k-1} - \sum_{i=1}^{N_k} a_i^{(k-1)} V_i^{(k-1)};$$

calculating, by the computer system, the norm $\|r_k\|$ of the approximated function $r_k$;

determining, by the computer system, a reconstruction term $N_k$ when $\|r_k\| \leq \varepsilon$; and approximating, by the computer system, the shape of the multi-object image by calculating a sum of approximated functions $\tilde{f} = f_0 + r_1 + r_2 \ldots + r_k$.

2. The method of claim 1, wherein $$F(t) = g_i(t) \; t \in \left[\frac{i}{n}, \frac{i+1}{n}\right],$$

i=0, 1, ... n, and n≠0.

3. The method of claim 1, wherein F(t) is represented as:

$$\begin{cases} x(t) = F_x(t) \\ y(t) = F_y(t) \end{cases}.$$

4. The method of claim 1, wherein by orthogonality, $$a_i^{(k)} = \int_0^1 \binom{x(t)}{y(t)} V_j^{(k)}(t) dt,$$

$j = 0, 1, 2, \ldots, n-1; k = 0, 1, 2, \ldots h.$

5. The method of claim 1 further comprising:
determining, by the computer system, a number of reconstruction terms by $N_1 + N_2 + \ldots + N_k$.

6. The method of claim 1 further comprising:
generating, by the computer system, a curve of the shape of a multi-object image by P(t) pairs of segmentation for a n-segment straight-line group of finite precision expression, wherein $$P(t) = \binom{x(t)}{y(t)} = \sum_{k=0}^{h} \sum_{i=0}^{N_k} a_i^{(k)} V_i^{(k)}(t).$$

7. A computer system that reduces consumption of computer resources to process instructions that reconstruct a shape of a multi-object image using finite terms, the computer system comprising:

a processor;

a memory having computer resources stored therein;

a non-transitory computer-readable medium having stored therein instructions that when executed cause the processor to:

convert the multi-object image into a binary image;

blur the binary image by applying a Gaussian blur to the binary image;

determine a contour of the binary image by removing an area of the binary image which is less than an area threshold;

approximate the contour of the binary image with a plurality of points;

selecting coordinates of the plurality of points that represent the shape of the multi-object image;

generate a function F(t) of the shape of the multi-object image based on the coordinates;

calculate an initial function $f_0$ that approximates the shape of the multi-object image by performing V-system of degree 0, $V_i^{(0)}$, to a function F(t) of the shape of the multi-object image, wherein $f_0$ is expressed as:

$$f_0 = \sum_{i=1}^{N_1} a_i^{(0)} V_i^{(0)};$$

calculate an error between the initial function and the function of the shape of the multi-object image by calculating an approximated function $r_1$ by $r_1 = F(t) - f_0$;

calculate a norm of function $\|r_1\|$;

determine a reconstruction term $N_1$ by comparing when $\|r_1\|$ is smaller than a predetermined threshold $\varepsilon$;

perform a hierarchical iteration from k=2 to k=h, wherein a norm $\|r_k\|$ of an approximated function $r_k$ equals to zero when k=h such that the hierarchical iteration ends and thereby the consumption of computer resources is reduced, the hierarchical iteration includes:

calculating an approximated function $r_k$ that approximates the shape of the multi-object image by performing V-system of degree k, $V_i^{(k)}$, to F(t), wherein $r_k$ is expressed as:

$$r_k = r_{k-1} - \sum_{i=1}^{N_k} a_i^{(k)} V_i^{(k)},$$

calculating the norm $\|r_k\|$ of function $r_k$;

determining a reconstruction term $N_k$ when $\|r_k\| \leq \varepsilon$; and approximate the shape of the multi-object image by calculating a sum of approximated functions $\tilde{f} = f_0 + r_1 + r_2 \ldots + r_k$.

8. The method of claim 7, wherein $$F(t) = g_i(t) \ t \in \left[\frac{i}{n}, \frac{i+1}{n}\right],$$

i=0, 1, ... n, and n≠0.

9. The computer system of claim 7, wherein F(t) is represented as:

$$\begin{cases} x(t) = F_x(t) \\ y(t) = F_y(t) \end{cases}.$$

10. The computer system of claim 7, wherein $$a_i^{(k)} = \int_0^1 \binom{x(t)}{y(t)} V_j^{(k)}(t) dt,$$

$j = 0, 1, 2, \ldots, n-1; k = 0, 1, 2, \ldots h.$

11. The computer system of claim 7, wherein a number of reconstruction terms are determined by $N_1 + N_2 + \ldots + N_k$.

12. The computer system of claim 7, wherein a curve of the shape of a multi-object image is represented by P(t) pairs of segmentation for a n-segment straight-line group of finite precision expression, wherein $$P(t) = \binom{x(t)}{y(t)} = \sum_{k=0}^{h} \sum_{i=0}^{N_k} a_i^{(k)} V_i^{(k)}(t).$$

13. A method that reduces consumption of computer resources in a computer system to generate a multi-object image using finite terms, the method comprising:

converting, by the computer system, the multi-object image into a binary image;

blurring, by the computer system, the binary image by applying a Gaussian blur to the binary image;

determining, by the computer system, a contour of the binary image by removing an area of the binary image which is less than an area threshold;

approximating, by the computer system, the contour of the binary image with a plurality of points;

selecting, by the computer system, coordinates of the plurality of points that represent a shape of the multi-object image;

generating, by the computer system, a function F(t) of the shape of the multi-object image based on the coordinates;

calculating, by a computer system, an initial function $f_0$ that approximates the shape of the multi-object image by performing V-system of degree 0, $V_i^{(0)}$, to a function F(t) of the shape of the multi-object image, wherein $f_0$ is expressed as:

$$f_0 = \sum_{i=1}^{N_1} a_i^{(0)} V_i^{(0)};$$

calculating, by the computer system, an error between the initial function and the function of the shape of the multi-object image by calculating an approximated function $r_1$ by $r_1 = F(t) - f_0$;

calculating, by the computer system, a norm of function $\|r_1\|$;

determining, by the computer system, a reconstruction term $N_1$ when $\|r_1\|$ is smaller than a predetermined threshold $\varepsilon$;

performing, by the computer system, a hierarchical iteration from k=2 to k=h, wherein a norm $\|r_k\|$ of an approximated function $r_k$ equals to zero for k=h such that the hierarchical iteration ends and thereby the consumption of computer resources is reduced, the hierarchical iteration includes:

calculating, by the computer system, an approximated function $r_k$ that approximates the shape of the multi-object image by performing V-system of degree k, $V_i^{(k)}$, to F(t), wherein $r_k$ is expressed as:

$$r_k = r_{k-1} - \sum_{i=1}^{N_k} a_i^{(k-1)} V_i^{(k-1)};$$

calculating, by the computer system, the norm $\|r_k\|$ of function $r_k$;

determining, by the computer system, a reconstruction term $N_k$ when $\|r_k\| \leq \varepsilon$; and generating, by the computer system, the shape of the multi-object image by calculating a sum of approximated functions $\tilde{f} = f_0 + r_1 + r_2 \ldots + r_k$.

14. The method of claim 13, wherein $F(t) = g_i(t)$ which is represented as:

$$\begin{cases} x(t) = Fx(t) \\ y(t) = Fy(t) \end{cases}; \text{ and } t \in \left[\frac{i}{n}, \frac{i+1}{n}\right],$$

i=0, 1, ... n, and n≠0.

15. The method of claim 13, wherein by orthogonality, $$a_i^{(k)} = \int_0^1 \binom{x(t)}{y(t)} V_j^{(k)}(t) dt,$$

$$j = 0, 1, 2, \ldots, n-1; k = 0, 1, 2, \ldots h.$$

16. The method of claim 13 further comprising:
determining, by the computer system, a number of reconstruction terms by $N_1 + N_2 + \ldots + N_k$.

17. The method of claim 13 further comprising:
generating, by the computer system, a curve of the shape of a multi-object image by P(t) pairs of segmentation for a n-segment straight-line group of finite precision expression, wherein $$P(t) = \binom{x(t)}{y(t)} = \sum_{k=0}^{h} \sum_{t=0}^{N_k} a_t^{(k)} V_t^{(k)}(t).$$

* * * * *